(12) United States Patent
Bai

(10) Patent No.: US 11,920,100 B2
(45) Date of Patent: *Mar. 5, 2024

(54) PROCESS FOR PRODUCING SOLID BIOMASS FUEL

(71) Applicant: Hong Mei Bai, Hong Kong (CN)

(72) Inventor: Hong Mei Bai, Hong Kong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/268,220

(22) PCT Filed: May 13, 2020

(86) PCT No.: PCT/GB2020/051171
§ 371 (c)(1),
(2) Date: Sep. 21, 2021

(87) PCT Pub. No.: WO2020/229824
PCT Pub. Date: Nov. 19, 2020

(65) Prior Publication Data
US 2021/0332304 A1 Oct. 28, 2021

(30) Foreign Application Priority Data

May 13, 2019 (GB) .................................... 1906699
Aug. 9, 2019 (GB) .................................... 1911408

(51) Int. Cl.
*C10L 5/44* (2006.01)
*C10L 5/36* (2006.01)
*C10L 9/08* (2006.01)

(52) U.S. Cl.
CPC ................ *C10L 5/44* (2013.01); *C10L 5/363* (2013.01); *C10L 9/083* (2013.01); *C10L 2290/08* (2013.01); *C10L 2290/28* (2013.01); *C10L 2290/32* (2013.01)

(58) Field of Classification Search
CPC .. C10L 5/44; C10L 5/363; C10L 9/083; C10L 2290/08; C10L 2290/28; C10L 2290/32
See application file for complete search history.

(56) References Cited

U.S. PATENT DOCUMENTS

| 2011/0258918 A1 | 10/2011 | Johal et al. | |
|---|---|---|---|
| 2013/0247456 A1* | 9/2013 | Dale | C08L 97/005 44/535 |
| 2019/0119593 A1* | 4/2019 | Hayashi | C10L 5/363 |

FOREIGN PATENT DOCUMENTS

| CN | 104232222 A | 12/2014 |
|---|---|---|
| CN | 105349209 A | 2/2016 |
| CN | 105419898 A | 3/2016 |

(Continued)

OTHER PUBLICATIONS

Akbar et al. "Characteristics of Red Kaliandra Pellets (Calliandra calothyrus) as Environmentally Friendly Energy Fuels" 2017 (Year: 2017).*

(Continued)

*Primary Examiner* — Latosha Hines
(74) *Attorney, Agent, or Firm* — Ryan T. Grace; Advent, LLP

(57) ABSTRACT

The present invention relates to a process for producing a solid biomass fuel, as well as a solid biomass fuel produced by said process. Additionally, the present invention relates to a combustion process comprising combusting said solid biomass fuel so as to produce energy.

17 Claims, 13 Drawing Sheets

(56) References Cited

FOREIGN PATENT DOCUMENTS

| | | | |
|---|---|---|---|
| CN | 106635232 | A | 5/2017 |
| CN | 107779235 | A | 3/2018 |
| CN | 108410531 | A | 8/2018 |
| JP | 2005179379 | A | 7/2005 |
| JP | 2007332274 | A | 12/2007 |
| JP | 2009051985 | A | 3/2009 |
| WO | 2016056608 | A1 | 4/2016 |
| WO | 2017175733 | A1 | 10/2017 |
| WO | 2019069849 | A1 | 4/2019 |
| WO | 2020229824 | A1 | 11/2020 |

OTHER PUBLICATIONS

International Search Report dated May 8, 2020 for App. No. PCT/GB2020/051171.
R Ikhsan Nur Akbar: II Karakteri Sti K Pellet Kaliandra Merah (Calliandra calothyrus) Sebagai Energi Bahan Bakar Ramah Lingkungan, Jan. 1, 2017 (Jan. 1, 2017), XP055714513, Retrieved from the Internet: URL:https://repository.ipb.ac.id/bitstream/handle/123456789/84210/E17rin.pdf?sequence=1&isAllowed=y[retrieved on Jul. 14, 2020] abstract p. 9.
UK Search Report for GB1906699.2 dated Oct. 7, 2019.
Examination Report for Application No. GB2211198.3, dated Sep. 1, 2022.
Notification of Reasons for Refusal in Japan for Patent Application No. 2019-195297 dated Jun. 26, 2023.

\* cited by examiner

The compression ratio: the ratio of the length to the diameter of the ring mold drain hole.

The compression ratio= length/diameter

| Parameter | Unit | LOQ (d) | Method | Amount (ar) | Amount (ad) | Amount (d) | Amount (daf)[1] | Amount in ash | Lab[2] |
|---|---|---|---|---|---|---|---|---|---|
| Average diameter | mm | | EN 16127 | 7.7 | -- | -- | -- | -- | B1 |
| Average length | mm | | EN 16127 | 9.3 | -- | -- | -- | -- | B1 |
| Overlengths > 40 and ≤ 45 mm | mass % | | EN 16127 | not found | -- | -- | -- | -- | B1 |
| Overlengths > 45 mm | mass % | | EN 16127 | not found | -- | -- | -- | -- | B1 |
| Dry mass | mass-% | 0.1 | DIN EN 14774-2 | 96.8 | 98.6 | -- | -- | -- | B1 |
| Moisture | mass-% | 0.1 | DIN EN 14774-2 | 3.2 | 1.4 | -- | -- | -- | B1 |
| Ash (550°C) | mass-% | 0.1 | DIN EN 14775 | 1.59 | 1.62 | 1.64 | -- | -- | B1 |
| Ash (815°C) | mass-% | 0.1 | sim. to DIN EN 14775 | 1.25 | 1.27 | 1.29 | -- | -- | B1 |
| Volatile matter incl. moisture | mass-% | 0.1 | DIN EN 15148 | -- | 70.7 | -- | -- | -- | B1 |
| Volatile matter | mass-% | 0.1 | DIN EN 15148 | 68.1 | 69.3 | 70.3 | 71.2 | -- | B1 |
| Fixed Carbon | mass-% | 0.1 | DIN 51734 | 27.5 | 28.0 | 28.4 | 28.8 | -- | B1 |
| Sulphur | mass-% | 0.01 | DIN EN 15289 | 0.015 | 0.015 | 0.015 | 0.015 | -- | B1 |
| Chlorine | mass-% | 0.01 | DIN EN 15289 | 0.018 | 0.018 | 0.018 | 0.019 | -- | B1 |
| Carbon | mass-% | 0.1 | DIN EN 15104 | 55.1 | 56.1 | 56.8 | 57.6 | -- | B1 |
| Hydrogen | mass-% | 0.1 | DIN EN 15104 | 5.14 | 5.23 | 5.31 | 5.38 | -- | B1 |
| Nitrogen | mass-% | 0.1 | DIN EN 15104 | 0.20 | 0.20 | 0.18 | 0.20 | -- | B1 |
| Oxygen | mass-% | 0.1 | DIN EN 15296 | 35.1 | 35.8 | 36.3 | 36.8 | -- | B1 |
| Gross CV, const v | MJ/kg | 0.5 | DIN EN 14918 | 22.03 | 22.44 | 22.76 | 23.06 | -- | B1 |
| Net CV, const p | MJ/kg | 0.5 | DIN EN 14918 | 20.83 | 21.26 | 21.60 | 21.89 | -- | B1 |
| Net CV, const v | MJ/kg | 0.5 | DIN EN 14918 | 20.90 | 21.32 | 21.67 | 21.95 | -- | B1 |
| Gross CV, const v | kcal/kg | 120 | DIN EN 14918 | 5262 | 5359 | 5436 | 5507 | -- | B1 |
| Net CV, const p | kcal/kg | 120 | DIN EN 14918 | 4976 | 5078 | 5160 | 5227 | -- | B1 |
| Net CV, const v | kcal/kg | 120 | DIN EN 14918 | 4992 | 5093 | 5176 | 5243 | -- | B1 |
| Gross CV, const v | MWh/t | 0.14 | DIN EN 14918 | 6.120 | 6.232 | 6.322 | 6.405 | -- | B1 |
| Net CV, const p | MWh/t | 0.14 | DIN EN 14918 | 5.787 | 5.906 | 6.001 | 6.080 | -- | B1 |
| Net CV, const v | MWh/t | 0.14 | DIN EN 14918 | 5.805 | 5.923 | 6.018 | 6.097 | -- | B1 |
| Gross CV, const v | BTU/lb | 210 | DIN EN 14918 | 9472 | 9648 | 9785 | 9913 | -- | B1 |
| Net CV, const p | BTU/lb | 210 | DIN EN 14918 | 8957 | 9141 | 9288 | 9409 | -- | B1 |
| Net CV, const v | BTU/lb | 210 | DIN EN 14918 | 8986 | 9168 | 9316 | 9436 | -- | B1 | ar - result calc. to 'as received' state  
ad - result calc. to 'air dry' state  
d - result calc. to 'bone dry' state  
daf - result calc. to 'dry and ash free' state -- not ordered / not applicable  
LOQ - Limit of quantitation 1) calculation basis is the ash amount at 815°C
2) The laboratory locations of the SGS Group Germany and Switzerland according to the above abbreviations are listed at http://www.institut-fresenius.de/filestore/68/laborstandortkuerzelags2.pdf
3) Analysis was performed by an accredited cooperation partner.

Figure 21

| Parameter | Unit | LOQ (d) | Method | Amount (ar) | Amount (ad) | Amount (d) | Amount (daf)[1] | Amount in ash | Lab[2] |
|---|---|---|---|---|---|---|---|---|---|
| Energy density (bulk, net) | GJ/m² | -- | calculated | 13,33 | -- | -- | -- | -- | B1 |
| Energy density (bulk, net) | kcal/m³ | -- | calculated | 3185000 | -- | -- | -- | -- | B1 |
| Energy density (particular, net) | GJ/m² | -- | calculated | 21,88 | -- | -- | -- | -- | B1 |
| Energy density (particular, net) | kcal/m³ | -- | calculated | 5225000 | -- | -- | -- | -- | B1 |
| *Minor elements:* | | | | | | | | | |
| Arsenic | mg/kg | 1 | DIN EN 15297 | < 1 | < 1 | < 1 | < 1 | -- | B1 |
| Cadmium | mg/kg | 0,3 | DIN EN 15297 | < 0,3 | < 0,3 | < 0,3 | < 0,3 | -- | B1 |
| Chromium | mg/kg | 1 | DIN EN 15297 | 4 | 4 | 4 | 4 | -- | B1 |
| Copper | mg/kg | 2 | DIN EN 15297 | 5 | 5 | 5 | 5 | -- | B1 |
| Lead | mg/kg | 3 | DIN EN 15297 | < 2,9 | < 3 | < 3 | < 3 | -- | B1 |
| Mercury | mg/kg | 0,05 | DIN EN 15297 | < 0,05 | < 0,05 | < 0,05 | < 0,05 | -- | B1 |
| Nickel | mg/kg | 1 | DIN EN 15297 | < 1 | < 1 | < 1 | < 1 | -- | B1 |
| Zinc | mg/kg | 1 | DIN EN 15297 | 10 | 10 | 10 | 10 | -- | B1 |
| Bulk density | kg/m³ | 1 | DIN EN 15103 | 640 | -- | -- | -- | -- | B1 |
| Particle density | kg/m³ | 1 | DIN 52182 | 1050 | -- | -- | -- | -- | B1 |
| Abrasion | mass-% | 0,1 | DIN EN 15210-1 | 2,4 | -- | -- | -- | -- | B1 |
| Durability | mass-% | 0,1 | DIN EN 15210-1 | 97,6 | -- | -- | -- | -- | B1 |
| Fines < 3,15 mm | mass-% | 0,1 | DIN EN 15149-2 | 0,5 | -- | -- | -- | -- | B1 |
| *Ash melting behaviour (reducing atmosphere) (ash fusion temperatures):* | | | | | | | | | |
| Shrinkage starting temperature SST | °C | | DIN CEN/TS 15370-1[3] | -- | -- | -- | -- | 1150 | -- |
| Deformation temperature DT | °C | | DIN CEN/TS 15370-1[3] | -- | -- | -- | -- | 1210 | -- |
| Hemisphere temperature HT | °C | | DIN CEN/TS 15370-1[3] | -- | -- | -- | -- | 1230 | -- |
| Flow temperature FT | °C | | DIN CEN/TS 15370-1[3] | -- | -- | -- | -- | 1230 | -- | ar -- result calc. to 'as received' state ad -- result calc. to 'air dry' state

-- not ordered / not applicable d -- result calc. to 'bone dry' state daf -- result calc. to 'dry and ash free' state LOQ -- Limit of quantitation 1) Calculation base is the ash amount at 815°C
2) The laboratory locations of the SGS Group Germany and Switzerland according to the above abbreviations are listed at https://www.institut-fresenius.de/de/filestore/89/laborstandortkuerzelsgs2.pdf 3) Analysis was performed by an accredited cooperation partner.

Figure 22

PROCESS FOR PRODUCING SOLID BIOMASS FUEL

FIELD OF THE INVENTION

The present invention relates to a process for producing a solid biomass fuel, as well as a solid biomass fuel produced by said process. Additionally, the present invention relates to a combustion process comprising combusting said solid biomass fuel so as to produce energy.

BACKGROUND OF THE INVENTION

Coal-fired power generation is used in power plants and industrial processes around the world. Coal and other fossil fuels are non-renewable energy resources. Over the last few decades, there have been calls to reduce the consumption of coal in coal-fired power stations and instead to use renewable resources for energy.

Fuels derived from biomass are an example of a renewable energy source that can be used to replace or at least partially replace coal. Biomass derived fuels can be burned in the presence of oxygen in power plants in combustion processes to produce energy. Biomass derived fuels can be combusted in traditional power plants originally designed for coal combustion, or biomass derived fuels can be combusted in power plants built specifically for biomass combustion. Certain forms of biomass can be mixed with coal and combusted in the same combustion process within a power plant. Such a process is known as coal co-firing of biomass. To be suitable for co-firing with coal, biomass derived fuel must typically have certain properties such as a certain level of quality and homogeneity with regard to properties. For example, biomass fuel comprised of particles of a homogenous size, density, moisture content etc. are particularly desirable in co-firing processes. It is also desirable that the biomass fuel contains a low level of ash. Levels of ash in biomass derived fuels are typically higher than those found in coal.

Various processes for producing solid biomass fuels from biomass sources are known. WO2014/087949 discloses a process for producing a solid biomass fuel in which a source of biomass is steam exploded before being molded into biomass blocks which are then heated so as to form the biomass fuel. The aim of the process is to produce biomass fuel with sufficient handleability during storage and with reduced chemical oxygen demand (COD) in discharged water during storage. The biomass source used in the process is palm kernel shell.

WO2016/056608 builds upon the teaching of WO2014/087949, and discloses a process for manufacturing solid biomass fuel in which the steam explosion step is not required to produce the fuel. The process comprises a molding step in which a biomass source is crushed before being compressed and molded into biomass blocks, before the biomass blocks are heated. The biomass source taught for use in said process is trees such as douglas fir, hemlock, cedar, cypress, European red pine, almond old tree, almond shell, *Acacia* xylem part, *Acacia* bark, walnut shell, sago palm, empty fruit bunches, meranti and rubber.

WO2017/175733 discloses a similar process comprising a molding step in which a biomass source is crushed before being compressed and molded into biomass blocks, before the biomass blocks are heated. The process of WO2017/175733 is directed to providing biomass fuel which exhibits low disintegration and achieves reduced COD in discharged water when exposed to rain water. The source of the biomass to be used in the process is selected from the rubber tree, *Acacia*, meranti, *eucalyptus*, teak and a mixture of larch, spruce and birch.

WO2019/069849 aims to provide a biomass fuel that is easy to transport and store and that is resistant to spontaneous combustion during storage. The biomass fuel is made by a process comprising a molding step in which a biomass source is crushed before being compressed and molded into biomass blocks, before the biomass blocks are heated. The biomass source for producing the fuel is selected from rubber trees, *Acacia* trees, *radiata* pine, a mixture of larch, spruce and birch; and spruce, pine and fir.

WO2019/069860 discloses an apparatus for producing biomass solid fuel. The apparatus comprises a carbonisation furnace for carbonising a molded biomass product to obtain a biomass solid fuel. The apparatus further comprises a yield calculation unit, a temperature measurement unit and a control unit. The control unit controls the heat applied to the carbonisation furnace based upon the spontaneous combustion properties of the biomass fuel. The molded biomass product is formed by pulverising a biomass source into pellets, before molding said pellets into a molded biomass product. The biomass source is selected from the rubber tree, *Acacia*, dipterocarp, radia pine, a mixture of larch, spruce and birch or a mixture of spruce, pine and firs.

WO2018/181919 discloses a different process to those discussed above for producing a solid biomass fuel. The process involves a step of hydrothermal carbonisation of biomass in which a biomass source is pressurised in hot water so as to carbonise the biomass. The process is reported to provide a biomass fuel with high grindability in high yield and with reduced manufacturing costs. The source of the biomass is selected from husks, palm kernel shell, coconut palm, bamboo, empty fruit bunches, apricots and aubergines.

WO2017/175737 discloses a cooling apparatus for cooling carbonised biomass. The apparatus improves the cooling efficiency of semi-carbonised molded biomass. The apparatus cools the biomass by spraying water thereon. The cooler comprises a vibration flat plate and a spraying section for spraying water on the flat plate. The biomass fuel is produced by the same processes as discussed above. The source of biomass for producing the biomass fuel is douglas fir, hemlock, cedar, cypress, European red pine, almond old tree, almond shell, *Acacia* xylem part, *Acacia* bark, walnut shell, sago palm, empty fruit bunches, meranti and the rubber tree.

Finally, WO2014/050964 discloses a process for improving the grindability of biomass such that it can be ground with coal. The process involves increasing the moisture content of ground wood biomass to between 10 to 50%; densifying the biomass to have a density of 0.55 g/cm$^3$ or higher, before subjecting the biomass to torrefaction. The source of biomass includes wood chips, bark, wood shavings, and sawdust The inventors of the present invention have appreciated that the solid biomass fuels and processes for their production discussed in the above documents have various problems associated with them. For example, the biomass sources described in the above documents are all plants and trees that typically only occur naturally, and that are not easy to cultivate and harvest on a commercial scale. The inventors have appreciated that it would be advantageous to have a source of biomass that can be grown and harvested easily on a commercial scale. It would also be advantageous to have a source of biomass that can be grown and harvested such that the quality and specific characteristics of the biomass source can be controlled.

Additionally, it has been found by the inventors that the sources of biomass described in the above documents, all being comprised of wood and similar materials, when subjected to conventional pulverising techniques known in the art, form particles with a low degree of homogeneity. Furthermore, pulverising the biomass sources is expensive due to the nature of the wood and wood-like material being difficult to pulverise. The inventors of the present invention have appreciated that it would be advantageous to have a source of biomass that is more easily pulverised by conventional pulverising techniques known in the art, and that forms more homogenous sized particles when pulverised.

Additionally, it has been found by the inventors that solid biomass fuels prepared from the biomass sources discussed in the above documents and prepared by the processes in the above documents do not have sufficient water proof characteristics. Water proof characteristics are important for solid biomass fuels since they need to be dry (or at least sufficiently dry) when used in a combustion process (either on their own or when co-fired with coal). Biomass fuels are frequently exposed to moisture during storage or transportation (such as from rain water). Accordingly, biomass fuels with increased water proof capacity are desirable.

The present inventors have also appreciated that the biomass fuel production processes described in the above documents do not provide fuels with sufficient quality and uniformity. In particular, the processes discussed above do not provide sufficient control of the density of the biomass during the molding step.

SUMMARY OF THE INVENTION

The present invention addresses the problems discussed above associated with prior processes. It has been surprisingly found by the inventors of the present invention that certain sources of biomass that are useful in providing solid biomass fuels, can be grown and harvested on a commercial scale. In doing so, a fixed and constant source of biomass for the production of fuels can be provided in growth cycles. Additionally, growing and harvesting said sources of biomass on a commercial scale enables control of the quality and uniformity of the biomass source, for example by cultivation and breeding techniques. Additionally, said sources of biomass have been found to be easier to grind than the tree and tree-like sources discussed in the prior art processes, leading to reduced process costs. The biomass sources used in the invention have also been found to provide greater homogeneity when ground compared to the biomass sources used in the prior art. In addition to the above, the inventors of the present invention have also found that biomass fuels with improved waterproof characteristics can be provided by modifying the molding and/or heating steps of the process. The control of the molding and heating steps of the process of the invention has also been found to improve the quality and uniformity of the solid biomass fuel product, as well as impart certain physical characteristics to it that are highly preferable for use in a combustion process. The inventors have found that the nature of the biomass source, and the specific features of the grinding, molding and heating step act together to provide a superior biomass fuel product for use in combustion processes over those known in the art.

According to a first aspect of the invention, there is provided a process for producing a solid biomass fuel, wherein the process comprises the following steps:

(i) pulverising one or more sources of biomass to provide a biomass powder with an average particle diameter (D50) of from 1000 μm to 6000 μm;
(ii) molding the biomass powder to provide a molded biomass product;
(iii) heating the molded biomass product to a temperature of from 160° C. to 420° C. for a time period of from 0.25 to 5 hours so as to provide a solid biomass fuel; wherein the one or more sources of biomass comprise (i) a species of the Fabaceae family, (ii) a mixture of straw, rice husk and coconut shell, or (iii) a mixture of *Acacia mangium, Albizia chinensis* and *Hevea brasiliensis*.

Preferably, the one or more sources of biomass comprises the species *Calliandra calothyrsus*. In one embodiment, the one or more sources of biomass consists essentially of *Calliandra calothyrsus*, and may even consist entirely of *Calliandra calothyrsus*. In another embodiment, the one or more sources of biomass comprise *Calliandra calothyrsus* and further comprise *Acacia mangium, Albizia chinensis, Hevea brasiliensis*, straw, rice husk, or coconut shell. In some embodiments, the one or more sources of biomass may comprise, consist essentially of or consist of i) *Calliandra calothyrsus, Acacia mangium, Albizia chinensis* and *Hevea brasiliensis*; or ii) *Calliandra calothyrsus*, straw, rice husk, and coconut shell.

The step of heating the molded biomass product is preferably carried out for a time period of from 0.5 to 3 hours.

The step of heating the molded biomass product comprises heating the molded biomass product to a temperature of from 180° C. to 350° C., and preferably to a temperature of from 210° C. to 280° C.

Preferably, the step of heating the molded biomass product comprises heating the molded biomass product so as to induce torrefaction of the molded biomass product.

Preferably, the process further comprises a step of drying the biomass powder prior to molding the biomass powder to provide a molded biomass product.

Preferably, the process comprises a step of cooling the solid biomass fuel after the heating step.

Step (ii) of molding the biomass powder may comprise adapting the molding step such that that density of the molded biomass product is controlled. Preferably, adapting the molding step such that the density of the molded biomass product is controlled comprises controlling the compression ratio of a mold used in said molding step.

Step (iii) of heating the molded biomass product is typically adapted so as to control the uniformity of the solid biomass fuel. Preferably, adapting step (iii) so as to control the uniformity of the solid biomass product comprises conducting step (iii) in an apparatus in which the molded biomass product is rotated whilst being heated. More preferably, adapting step (iii) so as to control the uniformity of the solid biomass product comprises controlling the speed or direction of rotation of the solid biomass product, optionally wherein the molded biomass product is rotated in the apparatus in both an anticlockwise and clockwise direction.

The bulk density of the solid biomass fuel produced, as determined according to DIN EN 15103, is typically from 0.6 kg/l to 0.8 kg/l, preferably from 0.6 kg/l to 0.75 kg/l, and most preferably from 0.6 to 0.7 kg/l.

The mechanical durability of the solid biomass fuel produced, as determined according to DIN EN 15210-1, is typically 95% or more, 96% or more, 97% or more, or 98% or more.

In some embodiments of the process, the one or more sources of biomass, and solid biomass fuel are as follows:

(i) the one or more sources of biomass comprises *Calliandra calothyrsus*, and wherein the bulk density of the solid biomass fuel is from 0.64 kg/l to 0.66 kg/l, and wherein the mechanical durability is 96% or more;

(ii) the one or more sources of biomass comprises a mixture of *Calliandra calothyrsus, Acacia mangium, Albizia chinensis* and *Hevea brasiliensis*, and wherein the bulk density of the solid biomass fuel is from 0.67 kg/l to 0.69 kg/l, and wherein the mechanical durability is 98% or more;

(iii) the one or more sources of biomass comprises a mixture of *Calliandra calothyrsus*, straw, rice husk, and coconut shell, and wherein the bulk density of the solid biomass fuel is from 0.61 kg/l to 0.63 kg/l, and wherein the mechanical durability is 95% or more;

(iv) the one or more sources of biomass comprises a mixture of a mixture of straw, rice husk and coconut shell, and wherein the bulk density of the solid biomass fuel is from 0.60 kg/l to 0.62 kg/l, and wherein the mechanical durability is 95% or more; or (v) the one or more sources of biomass comprises a mixture of *Acacia mangium, Albizia chinensis* and *Hevea brasiliensis*, and wherein the bulk density of the biomass solid fuel is from 0.66 kg/l to 0.68 kg/l, and wherein the mechanical durability is 97% or more;

wherein the bulk density is determined according to DIN EN 15103, and wherein the mechanical durability is determined according to DIN EN 15210-1.

Typically, the total dry sulphur content of the biomass solid fuel produced is 0.05 wt % or less, preferably 0.03 wt % or less, and most preferably 0.02 wt % or less, wherein the total dry sulphur content is determined according to DIN EN 15289.

Typically, the total dry hydrogen content of the biomass solid fuel produced is 5 wt % or more, preferably from 5 wt % to 10 wt %, and more preferably from 5 wt % to 7 wt %, wherein the total dry hydrogen content is determined according to DIN EN 15104.

Typically, the total dry oxygen content of the biomass solid fuel produced is 34 wt % or more, preferably from 34 wt % to 40 wt %, more preferably from 34 wt % to 38 wt %, wherein the total dry oxygen content is determined according to DIN EN 15296.

Typically, the total dry carbon content of the biomass solid fuel produced is 50 wt % or more, preferably from 53 wt % to 60 wt %, and more preferably from 53 wt % to 58 wt %, wherein total dry carbon content is determined according to DIN EN 15104.

Typically, the total dry nitrogen content of the biomass solid fuel produced is less than 0.3 wt %, preferably less than 0.25 wt % and more preferably less than 0.2 wt %, wherein the total dry nitrogen content is determined according to DIN EN 15104.

Typically, the solid biomass fuel produced is waterproof for up to 20 days, preferably up to 30 days, and more preferably up to 40 days.

Typically, the chemical oxygen demand (COD) of the solid biomass fuel produced, when immersed in water, is 5000 ppm or less, preferably 4000 ppm or less, and most preferably 3000 ppm or less, wherein the chemical oxygen demand is determined according to GB/11914-89.

Typically, the fixed carbon content of the solid biomass fuel produced is 25 wt % or more, preferably from 25 wt % to 35 wt %, more preferably from 25 wt % to 32 wt %, wherein the fixed carbon content is determined according to DIN EN 51734.

Typically, the ash content of the solid biomass fuel produced is less than 5 wt %, preferably less than 2.5 wt %, and most preferably less than 2 wt %, wherein the ash content is determined according to DIN EN 14775 at 550° C.

Typically, the moisture content of the solid biomass fuel produced is less than 5 wt %, preferably less than 2.5 wt %, and most preferably less than 2 wt %, wherein the moisture content is determined according to DIN EN 14774.

Typically, the volatile matter content of the solid biomass fuel produced is from 60 wt % to 80 wt %, more preferably from 60 wt % to 70 wt %, wherein the volatile matter content is determined according to DIN EN 15148.

Typically, the calorific value of the solid biomass fuel produced is from 5000 kcal/kg dry mass to 7000 kcal/kg dry mass, wherein the calorific value is determined according to DIN EN 14918.

Typically, where the bulk density of the molded biomass product is A, and the bulk density of the solid biomass fuel is B, B/A is from 0.55 to 1, wherein the bulk density is determined according to DIN EN 15103.

According to a second aspect of the invention, there is provided a solid biomass fuel obtainable or obtained by a process according to the first aspect of the invention.

According to a third aspect of the invention, there is provided a solid biomass fuel derived from one or more sources of biomass, wherein the one or more sources of biomass comprise (i) a species of the Fabaceae family, (ii) a mixture of straw, rice husk and coconut shell, or (iii) a mixture of *Acacia mangium, Albizia chinensis* and *Hevea brasiliensis*.

Preferably, the one or more sources of biomass comprises the species *Calliandra calothyrsus*. In one embodiment, the one or more sources of biomass consists essentially of, or even consists of, *Calliandra calothyrsus*.

In another embodiment, the one or more sources of biomass comprise *Calliandra calothyrsus* and further comprise *Acacia mangium, Albizia chinensis, Hevea brasiliensis*, straw, rice husk, or coconut shell. In some embodiments, the one or more sources of biomass may comprise, consist essentially of or consist of i) *Calliandra calothyrsus, Acacia mangium, Albizia chinensis* and *Hevea brasiliensis*; or ii) *Calliandra calothyrsus*, straw, rice husk, and coconut shell.

The bulk density of the solid biomass fuel, as determined according to DIN EN 15103, is typically from 0.6 kg/l to 0.8 kg/l, preferably from 0.6 kg/l to 0.75 kg/l, and most preferably from 0.6 to 0.7 kg/l.

The mechanical durability of the solid biomass fuel, as determined according to DIN EN 15210-1, is typically 95% or more, 96% or more, 97% or more, or 98% or more.

In some embodiments, the process, one or more sources of biomass, and solid biomass fuel are as follows:

(i) the one or more sources of biomass comprises *Calliandra calothyrsus*, and wherein the bulk density of the solid biomass fuel is from 0.64 kg/l to 0.66 kg/l, and wherein the mechanical durability is 96% or more;

(ii) the one or more sources of biomass comprises a mixture of *Calliandra calothyrsus, Acacia mangium, Albizia chinensis* and *Hevea brasiliensis*, and wherein the bulk density of the solid biomass fuel is from 0.67 kg/l to 0.69 kg/l, and wherein the mechanical durability is 98% or more;

(iii) the one or more sources of biomass comprises a mixture of *Calliandra calothyrsus*, straw, rice husk, and coconut shell, and wherein the bulk density of the solid biomass fuel is from 0.61 kg/l to 0.63 kg/l, and wherein the mechanical durability is 95% or more;

(iv) the one or more sources of biomass comprises a mixture of a mixture of straw, rice husk and coconut shell, and wherein the bulk density of the solid biomass fuel is from 0.60 kg/l to 0.62 kg/l, and wherein the mechanical durability is 95% or more; or (v) the one or more sources of biomass comprises a mixture of *Acacia mangium, Albizia chinensis* and *Hevea brasiliensis*, and wherein the bulk density of the biomass solid fuel is from 0.66 kg/l to 0.68 kg/l, and wherein the mechanical durability is 97% or more;

wherein the bulk density is determined according to DIN EN 15103, and wherein the mechanical durability is determined according to DIN EN 15210-1.

Typically, the total dry sulphur content of the biomass solid fuel is 0.05 wt % or less, preferably 0.03 wt % or less, and most preferably 0.02 wt % or less, wherein the total dry sulphur content is determined according to DIN EN 15289.

Typically, the total dry hydrogen content of the biomass solid fuel is 5 wt % or more, preferably from 5 wt % to 10 wt %, and more preferably from 5 wt % to 7 wt %, wherein the total dry hydrogen content is determined according to DIN EN 15104.

Typically, the total dry oxygen content of the biomass solid fuel is 34 wt % or more, preferably from 34 wt % to 40 wt %, more preferably from 34 wt % to 38 wt %, wherein the total dry oxygen content is determined according to DIN EN 15296.

Typically, the total dry carbon content of the biomass solid fuel is 50 wt % or more, preferably from 53 wt % to 60 wt %, and more preferably from 53 wt % to 58 wt %, wherein total dry carbon content is determined according to DIN EN 15104.

Typically, the total dry nitrogen content of the biomass solid fuel is less than 0.3 wt %, preferably less than 0.25 wt % and more preferably less than 0.2 wt %, wherein the total dry nitrogen content is determined according to DIN EN 15104.

Typically, the solid biomass fuel is waterproof for up to 20 days, preferably up to 30 days, and more preferably up to 40 days.

Typically, the chemical oxygen demand (COD) of the solid biomass fuel when immersed in water is 5000 ppm or less, preferably 4000 ppm or less, and most preferably 3000 ppm or less, wherein the chemical oxygen demand is determined according to GB/11914-89.

Typically, the fixed carbon content of the solid biomass fuel produced is 25 wt % or more, preferably from 25 wt % to 35 wt %, more preferably from 25 wt % to 32 wt %, wherein the fixed carbon content is determined according to DIN EN 51734.

Typically, the ash content of the solid biomass fuel produced is less than 5 wt %, preferably less than 2.5 wt %, and most preferably less than 2 wt %, wherein the ash content is determined according to DIN EN 14775 at 550° C.

Typically, the moisture content of the solid biomass fuel produced is less than 5 wt %, preferably less than 2.5 wt %, and most preferably less than 2 wt %, wherein the moisture content is determined according to DIN EN 14774.

Typically, the volatile matter content of the solid biomass fuel produced is from 60 wt % to 80 wt %, more preferably from 60 wt % to 70 wt %, wherein the volatile matter content is determined according to DIN EN 15148.

Typically, the calorific value of the solid biomass fuel produced is from 5000 kcal/kg dry mass to 7000 kcal/kg dry mass, wherein the calorific value is determined according to DIN EN 14918.

Typically, where the bulk density of the molded biomass product is A, and the bulk density of the solid biomass fuel is B, the ratio B/A is from 0.55 to 1, wherein the bulk density is determined according to DIN EN 15103.

According to a fourth aspect of the invention, there is provided a combustion process comprising the step of combusting a solid biomass fuel in accordance with the second and third aspects of the invention so as to produce energy.

In one embodiment, the solid biomass fuel is co-fired and combusted alongside a fossil fuel. Preferably, the fossil fuel comprises coal.

In one embodiment, the PM1.0 emissions of the process are less than 175 mg/kg, and preferably less than 150 mg/kg.

According to a fifth aspect of the invention, there is provided the use of a solid biomass fuel according to the second and third aspects of the invention as a fuel in a combustion process.

Preferably, the combustion process comprises co-firing the solid biomass fuel alongside a fossil fuel. Preferably, the fossil fuel is coal.

In one embodiment, the PM1.0 emissions of the process are less than 175 mg/kg, and preferably less than 150 mg/kg.

According to a sixth aspect of the invention, there is provided the use of one or more sources of biomass to produce a solid biomass fuel, wherein the one or more sources of biomass comprise (i) a species of the Fabaceae family, (ii) a mixture of straw, rice husk and coconut shell, or (iii) a mixture of *Acacia mangium, Albizia chinensis* and *Hevea brasiliensis*.

Preferably, the one or more sources of biomass are as described above in accordance with first and third aspects of the invention.

Preferably, the use comprises using the one or more sources of biomass in a process according to the first aspect of the invention.

Preferably, the solid biomass fuel is as described above in accordance with the first and third aspects of the invention.

BRIEF DESCRIPTION OF THE DRAWINGS

The present inventions will now be described by way of example and with reference to the accompanying Figures in which:

FIGS. 21 and 22 show various physical and chemical properties of a solid biomass fuel pellet of the present invention.

DETAILED DESCRIPTION OF THE INVENTION

Sources of Biomass

Figure 1:
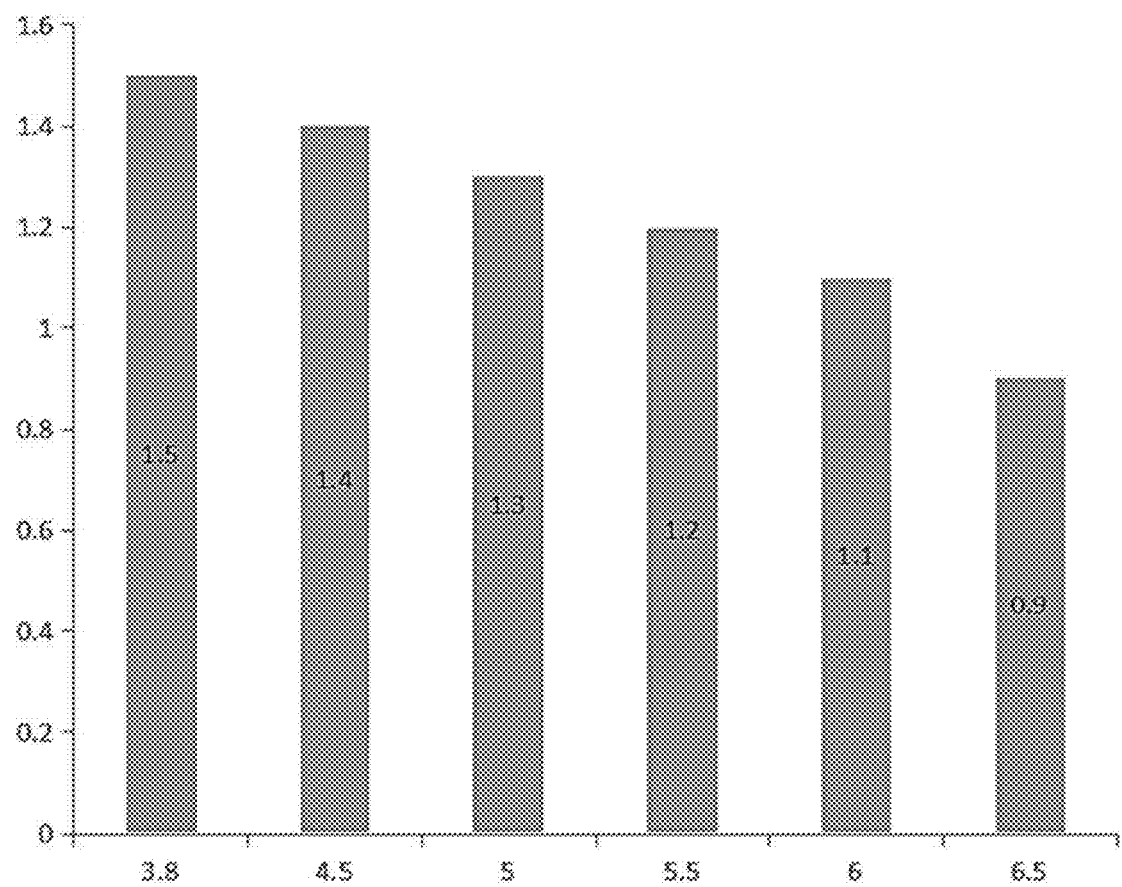
FIG. 1 is a graph depicting compression ratio on the x-axis against yield on the y-axis for a molded biomass product produced in accordance with the process of the invention where the biomass source consists of *Calliandra calothyrsus*.

The one or more sources of biomass used in accordance with the present invention can be any of those discussed above. In a preferable embodiment, the one or more sources of biomass comprise, consist essentially of or consist of *Calliandra calothyrsus*. Where the one or more sources of biomass comprise *Calliandra calothyrsus* and one or more additional sources of biomass, the one or more sources of biomass may contain any specific amount of the *Calliandra calothyrsus* such as from 5 wt % to 95 wt %. Typically, where the one or more sources of biomass comprise *Calliandra calothyrsus* and one or more additional sources of biomass, the *Calliandra calothyrsus* is present in an amount of from 50 wt % to 90 wt % of the one or more sources of biomass. Where the one or more sources of biomass comprise or consist of a mixture of straw, rice husk and coconut shell, or a mixture of *Acacia mangium, Albizia chinensis* and *Hevea brasiliensis*, each component of the or more sources of biomass can be present in any suitable amount such as in an amount of from 5 wt % to 95 wt %. Each of the one or more sources of biomass discussed above can be obtained or harvested by routine methods known in the art.

As discussed above, it has been found that the one or more sources of biomass used in the present invention can be grown and harvested on a commercial scale, providing increased control of the quality and specific characteristics of the biomass source compared to the tree wood materials used in the prior art. Use of said materials also avoids the environmental damage associated with using trees such as necessary deforestation. Use of the one or more sources of biomass used in the present invention has also surprisingly been found to be easier to grind than said prior used materials, reducing the costs of the grinding process. Use of the materials of the invention, when ground, also provides a more homogenous mix of particle sizes than said prior used materials. Without being limited by theory, this is believed to impart advantageous properties to the final solid fuel product, such as greater uniformity and continuousness of the biomass fuel products. This is desirable in combustion processes for a number of reasons.

Pulverisation of Biomass

The biomass source may be pulverised into a biomass powder by standard techniques known in the art. The biomass source may be pulverised such that the biomass powder has an average particle diameter (D50) of from 1000 μm to 6000 μm. As discussed above, pulverising the specific biomass sources for use in the present invention has been found to provide a biomass powder with an advantageous smaller particle size distribution than provided by grinding prior known biomass sources.

Molding the Biomass Powder

The biomass powder is molded so as to provide a molded biomass product. The molding step may be carried out in any molding apparatus known in the art and in accordance with biomass molding techniques known in the art, and may include extrusion systems. Preferably, the molding step is carried out in a compression mold. Preferably, the compression mold comprises a mold product exit hole. The molding step may be carried out using an apparatus as described in CN105435708.

Preferably, the molding step comprises molding the biomass powder into pellets. Accordingly, in a preferred embodiment, the molded biomass product comprises biomass pellets.

Whilst it is known to mold biomass powder to produce molded biomass products, the inventors of the present invention have surprisingly discovered that adapting the molding step such that the density of the molded biomass product produced from said step is controlled so as to be within a certain range imparts certain advantageous properties to the final solid biomass fuel product. Specifically, controlling the molding step such that the bulk density of the molded biomass product is within the range of from 0.9 to 1.6 kg/L has been found to impart advantageous properties to the final biomass fuel product. Preferably, the molding step is controlled such that the bulk density of the molded biomass product is from 1.1 kg/L to 1.25 kg/L.

The molding step may be controlled in a variety of ways. Where the molding process comprises the use of a compression mold, the density is controlled by using a compression ratio of from 3.8 to 6.5. Typically, the smaller the compression ratio, the lower the density of the molded biomass product. However, the higher the compression ratio, the lower the yield of the molded biomass product.

The compression ratio for a compression mold with a mold product exit hole may be defined as the ratio of the length to the diameter of the mold product exit hole.

Figure 19:
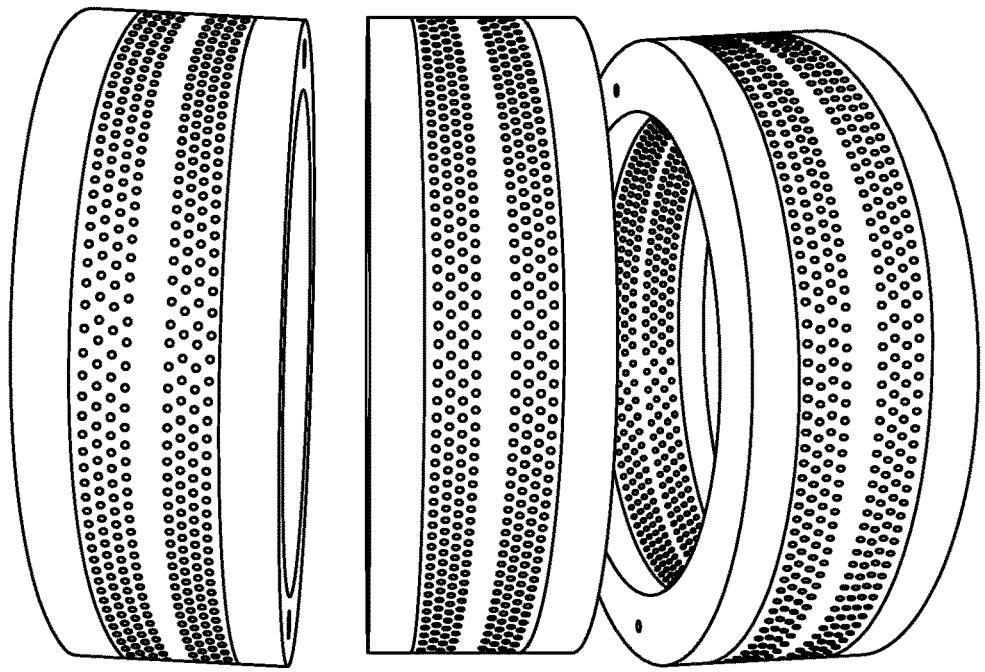
FIGS. 19 and 20 are diagrams of a compression mold that may be used in the molding step of the process of the invention.
Figure 20:
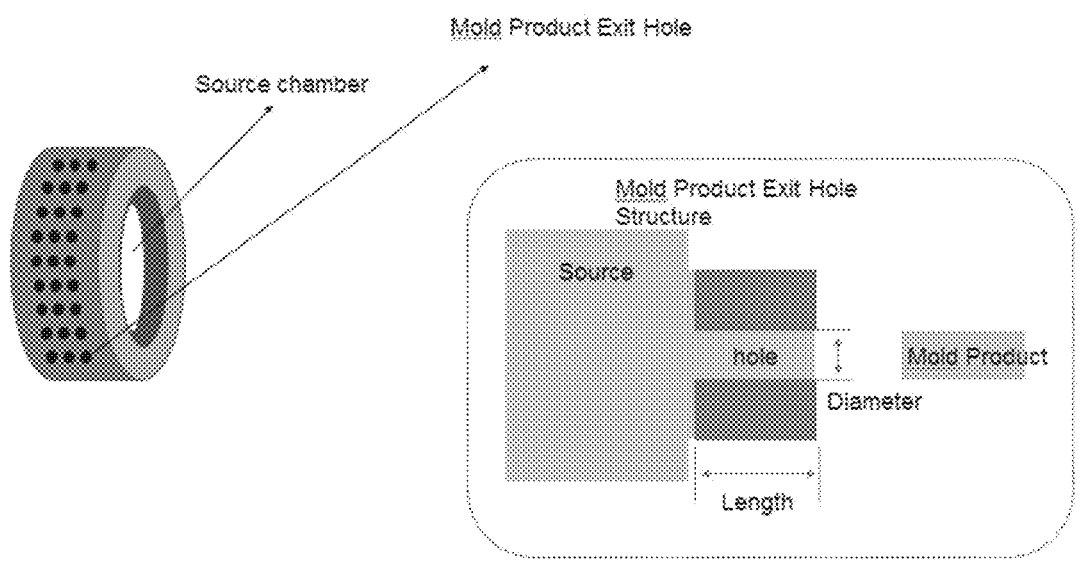

FIGS. 19 and 20 shows an example of a compression mold that may be used in accordance with the present invention. The biomass powder is inserted into the interior of the mold before being squeezed from inside the mold by pressure such that it exits the mold product exit hole in the Figure. The compression ratio is shown in the Figure as the ratio of the length of the product out hole to its diameter.

In the process of the invention, preferably, the step (ii) of molding the biomass powder comprises adapting the molding step such that that density of the molded biomass product is controlled to be within the range of from 1.1 kg/L to 1.25 kg/L. Preferably, the density is controlled by using a compression mold and controlling the compression ratio of the compression mold. More preferably, the compression ratio is from 3.8 to 6.5.

Controlling the density of the molded biomass product during the molding step has been found, surprisingly, to provide final biomass fuel product with increased water proof capacity. Preferably, the solid biomass fuel product produced from a molded biomass product with a density within the range of from 1.1 kg/L to 1.25 kg/L is sufficiently water proof for up to 20 days, and preferably up to 30 days.

FIG. 1 is a graph depicting compression ratio on the x-axis against yield on the y-axis for a molded biomass product produced in accordance with the process of the invention where the biomass source consists of *Calliandra calothyrsus*.

Figure 2:
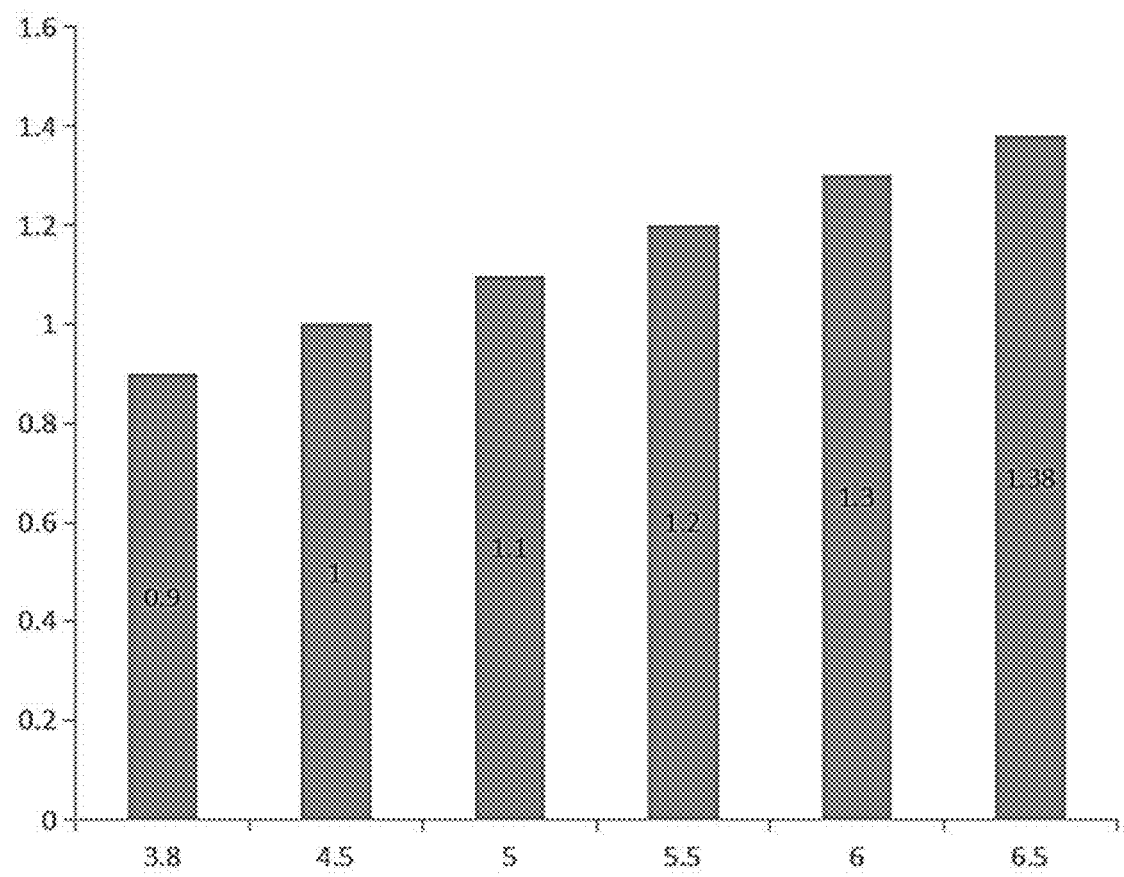
FIG. 2 is a graph depicting compression ratio on the x-axis against density on the y-axis in kg/L for a molded biomass product produced in accordance with the process of the invention where the biomass source consists of *Calliandra calothyrsus*.

FIG. 2 is a graph depicting compression ratio on the x-axis against density on the y-axis in kg/L for a molded biomass product produced in accordance with the process of the invention where the biomass source consists of *Calliandra calothyrsus*.

Heating the Molded Biomass Product

The molded biomass product is heated so as to produce a solid biomass fuel. The heating is carried out at a temperature of from 160° C. to 420° C. for a time period of from 0.25 to 5 hours. Preferably, the step of heating the molded biomass product is carried out for a time period of from 0.5 to 3 hours. Preferably, the step of heating the molded biomass product comprises heating the molded biomass product to a temperature of from 180° C. to 350° C., and more preferably to a temperature of from 210° C. to 280° C.

As discussed above, preferably the molded biomass product comprises pellets when heated in heating step (iii) of the process of the invention.

Preferably, the step (iii) of heating the molded biomass product comprises heating the molded biomass product under conditions so as to induce torrefaction of the molded biomass product. Torrefaction is a process of mild pyrolysis in which the heating is carried out in a low oxygen atmosphere such as an atmosphere of less than 10% oxygen content. Suitable conditions and processes of torrefaction are known in the art. Accordingly, preferably step (iii) of heating the molded biomass product comprises torrefaction. Using a molded biomass product comprising pellets is advantageous over prior known processes of torrefaction where ground biomass sources such as wood chips are subjected to torrefaction directly without being ground into pellets. Pellets are generally much denser than wood chips, meaning that they contain more energy per unit volume. The lower volume saves on the energy requirements of the torrefaction heating apparatus. The use of pellets is thus more economical. The heating step may be carried out in any suitable apparatus known in the art for heating a molded biomass product so as to produce a solid biomass fuel product. For example, the heating step may be carried out in apparatus and using process conditions as disclosed in EP3287509A1.

Preferably, step (iii) of heating the molded biomass product is adapted so as to control the uniformity of the solid biomass fuel, optionally wherein adapting step (iii) so as to control the uniformity of the solid biomass product comprises conducting step (iii) in an apparatus in which the molded biomass product is rotated whilst being heated, optionally, wherein adapting step (iii) so as to control the uniformity of the solid biomass product comprises controlling the speed or direction of rotation of the solid biomass product, optionally wherein the molded biomass product is rotated in the apparatus in both an anticlockwise and clockwise direction. The uniformity of the biomass product is also optimised by the heating temperatures and time periods discussed above.

Where the process of the invention comprises a cooling step after the step of heating the biomass, the cooling step may comprise rotating the biomass. The biomass may be rotated in a suitable apparatus such as those disclosed in EP3287509A1. Preferably, both heating step (iii) and the step of cooling the biomass comprise rotating the biomass. Where the biomass is rotated in either the cooling step or the heating step, the biomass may be rotated in different directions, such as both clockwise and anti-clockwise in successive cycles.

The term 'uniformity' of the solid biomass product is used to refer to the solid biomass fuel product having constant or similar properties across each particle of solid biomass fuel and across the plurality of particles within a bulk sample of the solid biomass fuel product. For example, but not limited to, the densities of the particles, the ease of combustion of the particles, the chemical composition of the particles, and the water resistant properties of the particles. Uniformity is a highly desirable property for biomass fuels for use in combustion processes.

It has also been found by the inventors that controlling the heating step in the manner discussed above additionally aids in providing a solid biomass fuel product with enhanced water proof properties compared to the biomass fuels of the prior art.

The Solid Biomass Fuel Product

The solid biomass fuel product may have any of the physical properties discussed above.

As discussed above, the biomass solid fuel of the invention preferably comprises pellets. The pellets may be any suitable size. Preferably, the pellets have a diameter of from 3 mm to 100 mm, and more preferably, 5 mm to 8 mm. Preferably, the pellets have a length of from 20 mm to 60 mm, and more preferably from 30 mm to 50 mm. As discussed above, surprisingly, it has been found that the solid biomass fuel product of the invention has enhanced waterproof characteristics compared to solid biomass fuel products made by prior art processes. This is believed to be due to controlling the molding and/or heating step as discussed above. Biomass fuels of the prior art have been found by the inventors to be sufficiently water proof for only up to 10 days. In contrast, it has been found the solid biomass fuel products of the invention are sufficiently water proof up to 20 days, preferably 30 days and more preferably 40 days.

The water proof properties of the solid biomass fuels are determined according to standard tests of the Energy Research Centre of the Netherlands (ECN), described in further detail below.

The moisture content of the biomass solid fuel of the invention may also be determined by standard ECN test methods. The moisture content of the solid biomass fuel of the invention is typically from 5 to 9 wt %, preferably 6 to 8 wt %, and more preferably 6 to 7 wt %.

The solid biomass fuel of the invention has also been found to have unexpectedly high mechanical durability. The mechanical durability is typically higher than 95%. This is advantageous since biomass pellets of 95% mechanical durability or greater have been found to be able to stored outside without damage to for periods as long as two months. In contrast, biomass pellets with less than 95% mechanical durability typically are damaged by rainfall and are not able to be stored outside. Accordingly, high mechanical durability is an additional advantage of biomass pellets of the invention.

An additional advantage associated with high durability of the solid biomass fuel particles is that if the pellets are somehow broken by force, they fall apart in larger pieces than pellets with low mechanical durability. This minimises any dust explosion risks.

Combustion Processes

The product of the present invention may be used in a variety of different combustion processes. The suitability of said products for use in a particular process will be apparent to those of skill in the art. For example, the biomass fuel of the invention may be used in a combustion process in a power plant or industrial process on its own. Alternatively, the biomass product of the invention may be used in a combustion process along with an additional fuel such as coal in a co-firing process.

Advantageously, products of the invention have been found to provide very low PM1.0 emissions when compared to other biomass fuels known in the art. Additionally, the PM1.0 emissions of the process are lower than processes that involve the combustion of coal.

Advantageously, the improved physical properties of biomass fuels of the invention have been found to render the biomass particularly suitable for co-firing with coal. For example, the improved quality and uniformity of the product enable the biomass fuel of the invention to be co-fired with coal particularly well. The improved water proof properties of the biomass fuel of the invention also mean that the biomass is particularly suited to being co-fired with coal as well as being made easier to store and transport due to its water proof nature.

Example 1

A process according to the present invention was carried out. The source of biomass was *Calliandra calothyrsus* only. The temperature of the heating step was from 220° C. to 280° C. for a time period of from 0.5 to 3.5 hours, and cooled to obtain a solid biomass fuel.

Figure 3:
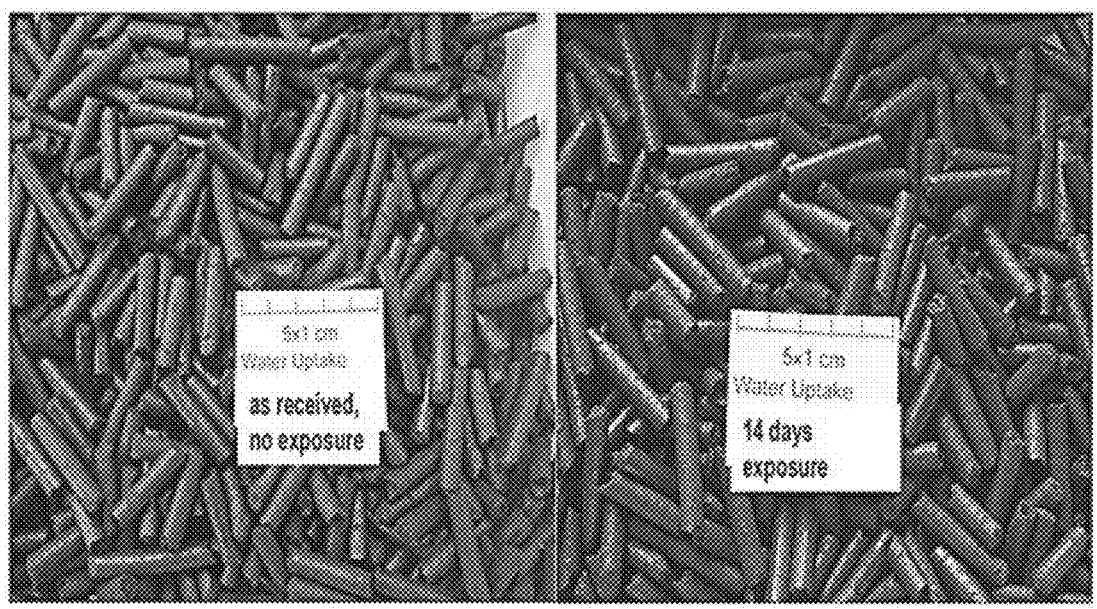
FIG. 3 is a photograph of a biomass fuel product of the invention.

A photograph of the solid product is shown in FIG. 3.

Example 2

A process according to the present invention was carried out. The source of biomass was *Calliandra calothyrsus* in an amount of 70 wt %, *Acacia mangium* in an amount of 10 wt %, *eucalyptus* (*Albizia chinensis*) in an amount 10 wt % and the rubber tree (*Hevea brasiliensis*) in an amount of 10 wt %.

The temperature of the heating step was from 220° C. to 280° C. for a time period of from 0.5 to 3.5 hours, and cooled to obtain a solid biomass fuel.

Example 3

A process according to the present invention was carried out. The source of biomass was *Calliandra calothyrsus* in an amount of 70 wt %, straw in an amount of 10 wt %, rice husk in an amount of 10 wt %, and coconut shell in an amount of 10 wt %.

The temperature of the heating step was from 220° C. to 280° C. for a time period of from 0.5 to 3.5 hours, and cooled to obtain a solid biomass fuel.

Example 4

A process according to the present invention was carried out. The source of biomass was straw in an amount of 40 wt %, rice husk in an amount of 10 wt %, and coconut shell in an amount of 50 wt %.

The temperature of the heating step was from 220° C. to 280° C. for a time period of from 0.5 to 3.5 hours, and cooled to obtain a solid biomass fuel.

Example 5

A process according to the present invention was carried out. The source of biomass was *Acacia mangium* in an amount of 30 wt %, *Albizia chinensis* in an amount of 30 wt % and rubber tree (*Hevea brasiliensis*) in an amount of 40 wt %.

The temperature of the heating step was from 220° C. to 280° C. for a time period of from 0.5 to 3.5 hours, and cooled to obtain a solid biomass fuel.

Characterisation of Solid Biomass Fuels of Examples 1 to 5

Figure 4:
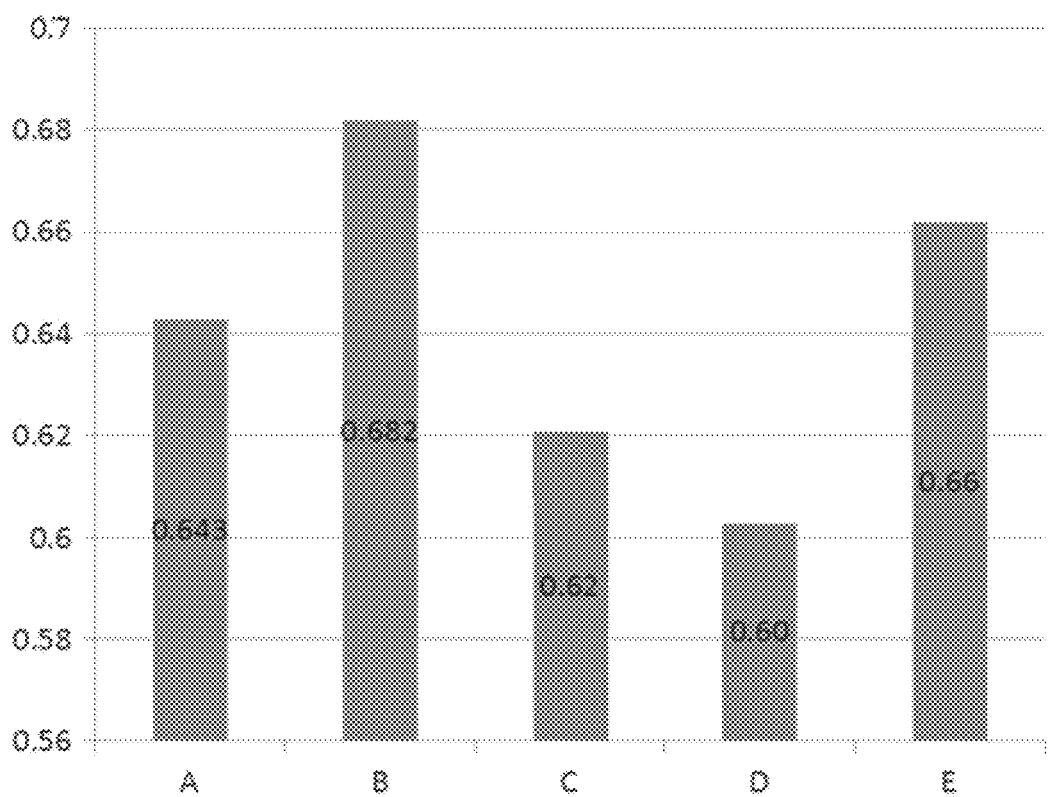
FIG. 4 is a graph depicting bulk density of several products of the invention.

The bulk density in kg/l of the solid biomass fuel produced in examples 1 to 5 is shown in FIG. 4. The bulk density was determined using DIN EN 15103 to be 0.643 kg/L.

Figure 5:
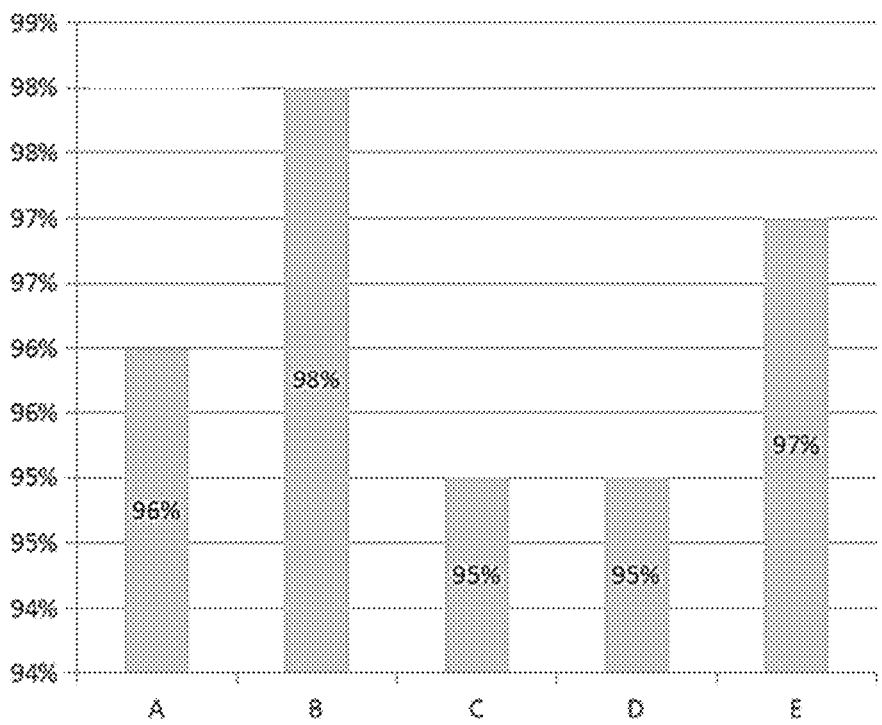
FIG. 5 is a graph depicting durability of several products of the invention.

The durability of the solid biomass fuel produced in examples 1 to 5 is shown in FIG. 5. The durability was determined according to DIN EN 15210-1.

Figure 6:
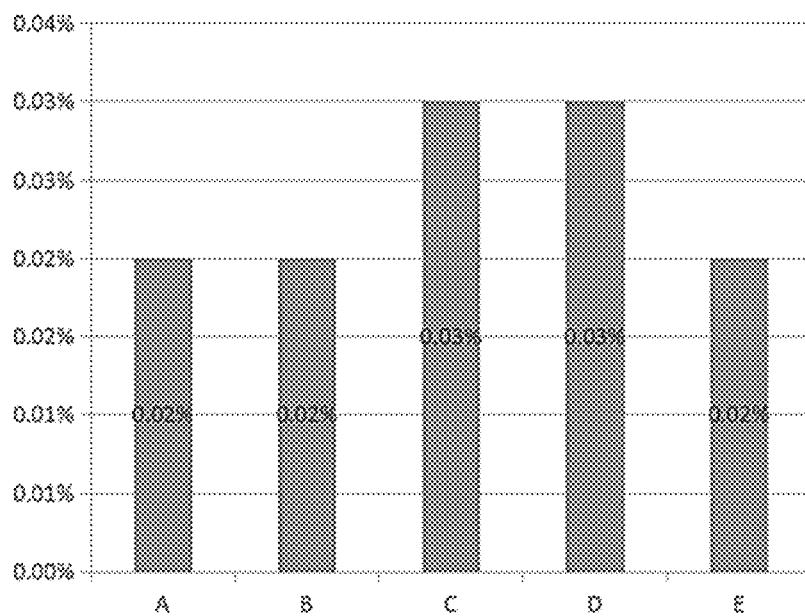
FIG. 6 is a graph depicting sulphur content of several products of the invention.

The sulphur content of the solid biomass fuel produced in examples 1 to 5 is shown in FIG. 6. The sulphur content was determined according to DIN EN 15289.

Figure 7:
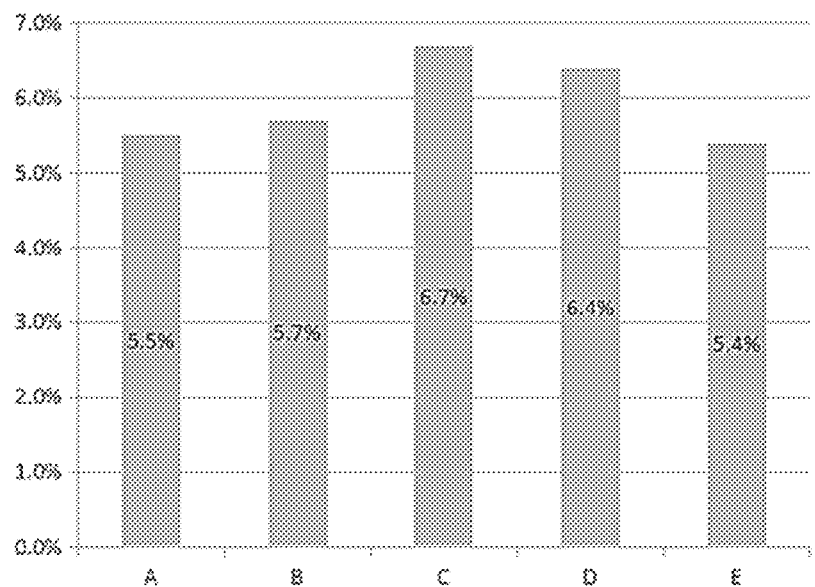
FIG. 7 is a graph depicting oxygen content of several products of the invention.

The oxygen content of the solid biomass fuel produced in examples 1 to 5 is shown in FIG. 7. The oxygen content was determined according to DIN EN 15296.

Figure 8:
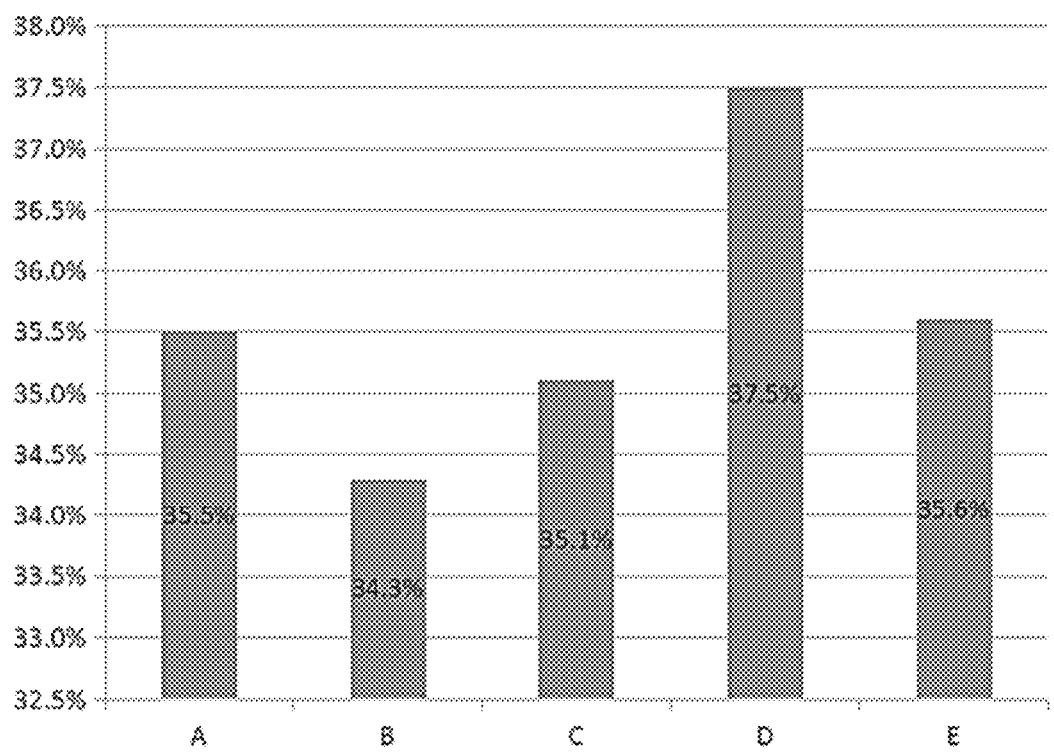
FIG. 8 is a graph depicting carbon content of several products of the invention.

The carbon content of the biomass solid fuel produced in examples 1 to 5 is shown in FIG. 8. The carbon content was determined according to DIN EN 15104.

Figure 9:
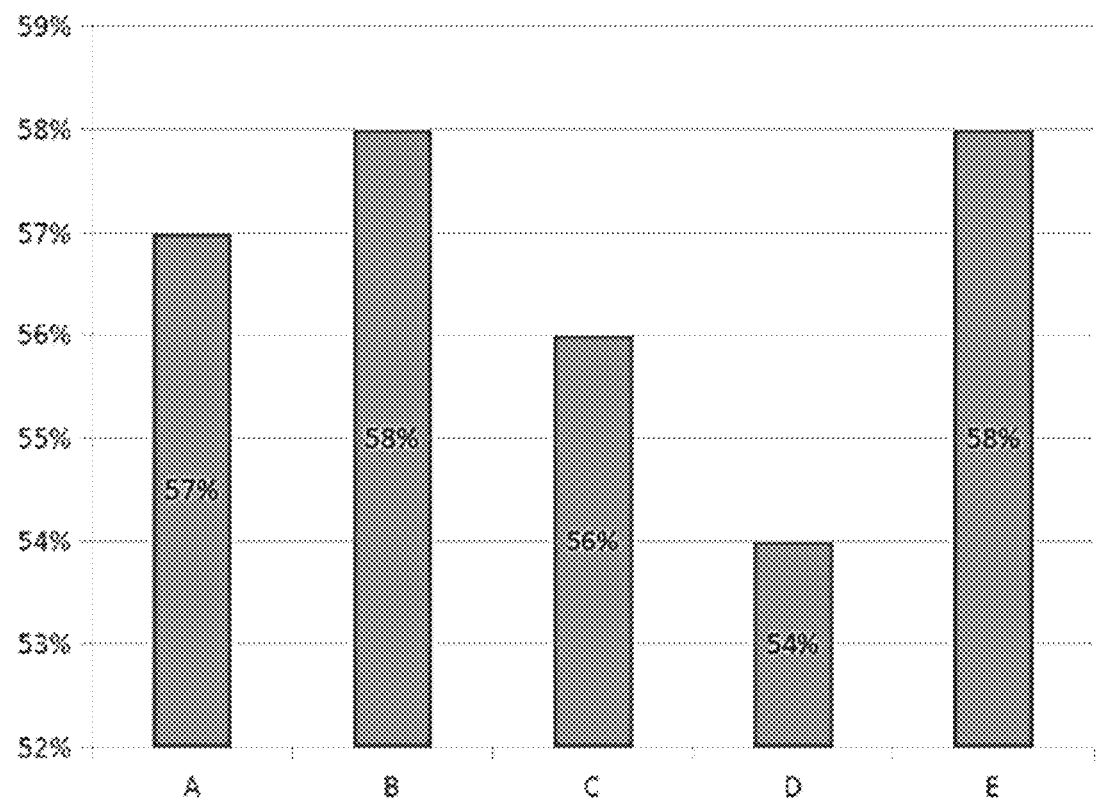
FIG. 9 is a graph depicting nitrogen content of several products of the invention.

The nitrogen content of the biomass solid fuel produced in examples 1 to 5 is shown in FIG. 9. The nitrogen content was determined according to DIN EN 15104.

Figure 10:
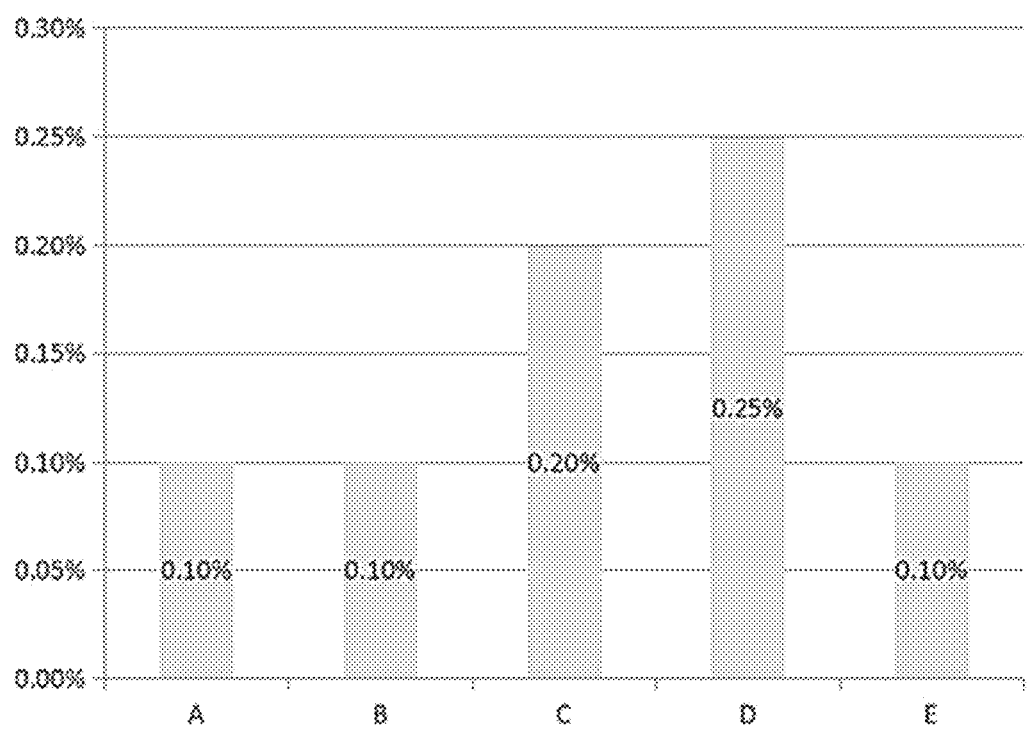
FIG. 10 is a graph depicting carbon content of several products of the invention.

The fixed carbon content of the biomass solid fuel produced in examples 1 to 5 is shown in FIG. 10. The fixed carbon content was determined according to DIN EN 51734.

Figure 11:
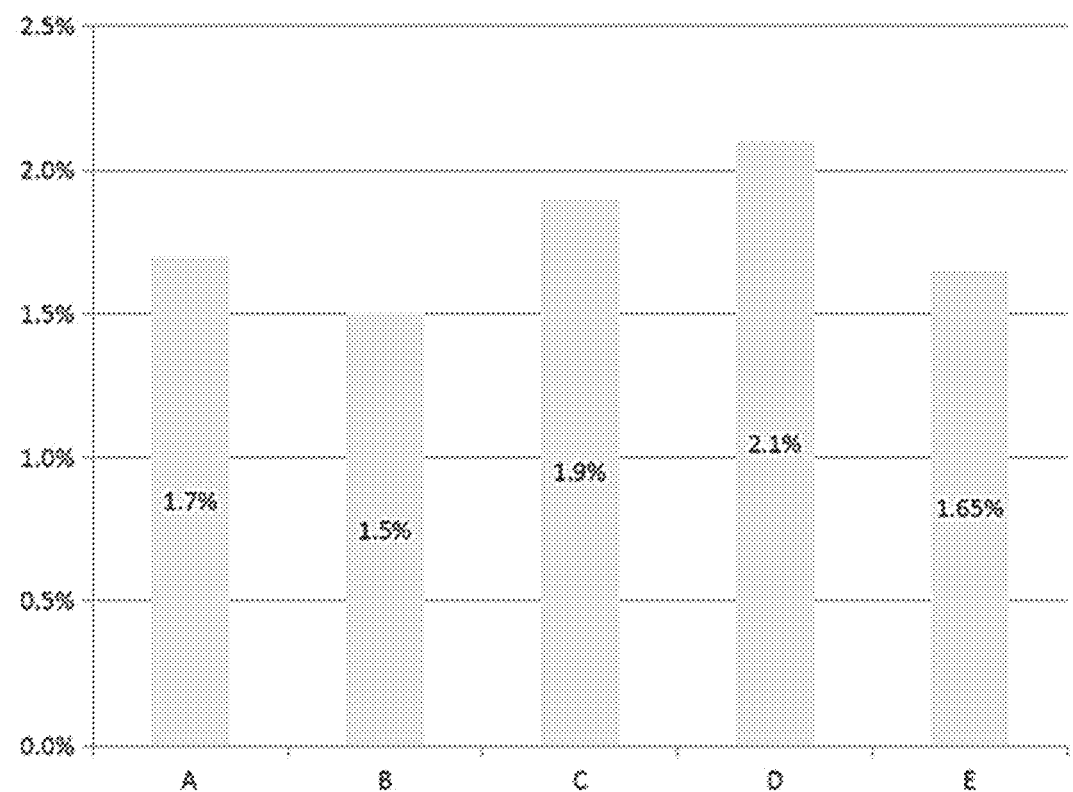
FIG. 11 is a graph depicting ash content of several products of the invention.

The ash content of the biomass solid fuel produced in examples 1 to 5 is shown in FIG. 11. The ash content is determined according to DIN EN 14775 at 550° C.

Figure 12:
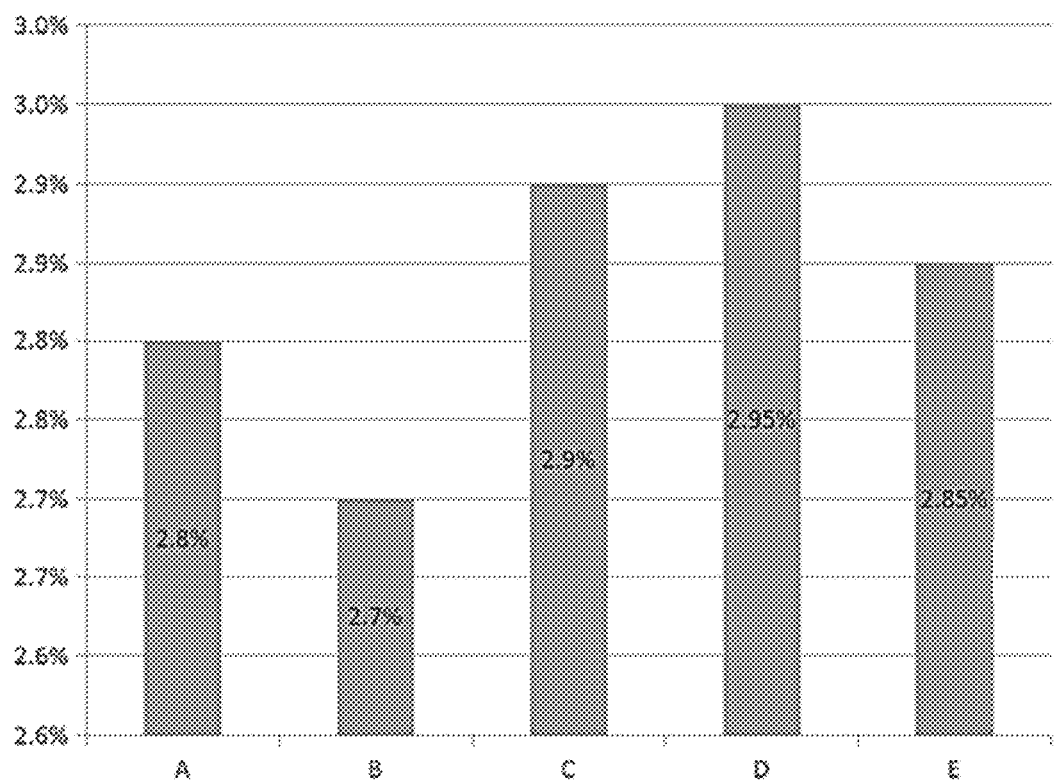
FIG. 12 is a graph depicting moisture content of several products of the invention.

The moisture content of the biomass solid fuel produced in examples 1 to 5 is shown in FIG. 12. The moisture content was determined according to DIN EN 14774-2.

Figure 13:
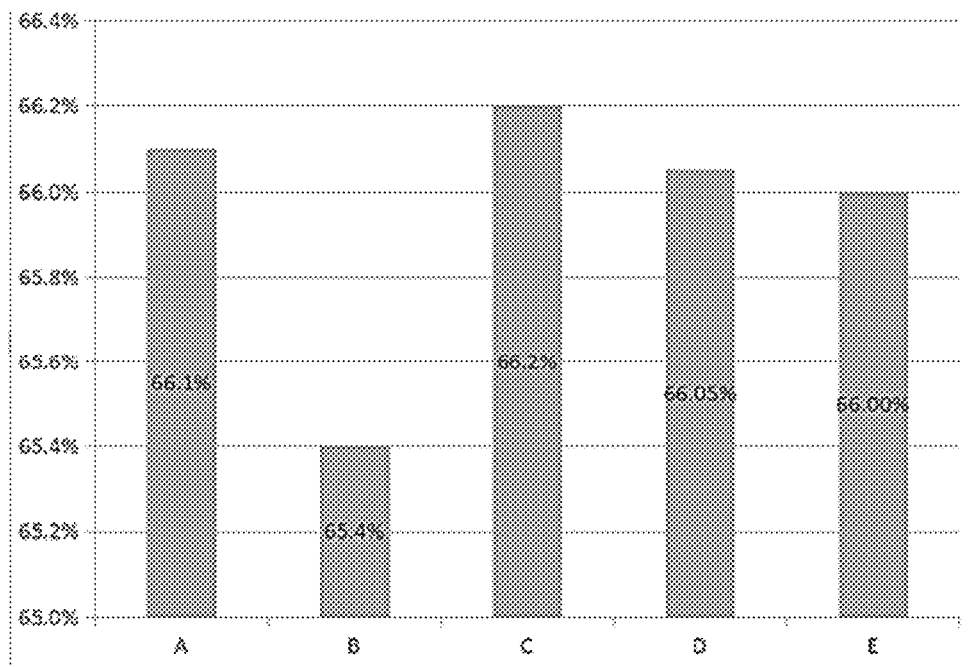
FIG. 13 is a graph depicting volatile matter content of several products of the invention.

The volatile matter content of the solid biomass fuel as produced in examples 1 to 5 is shown in FIG. 13.

Figure 14:
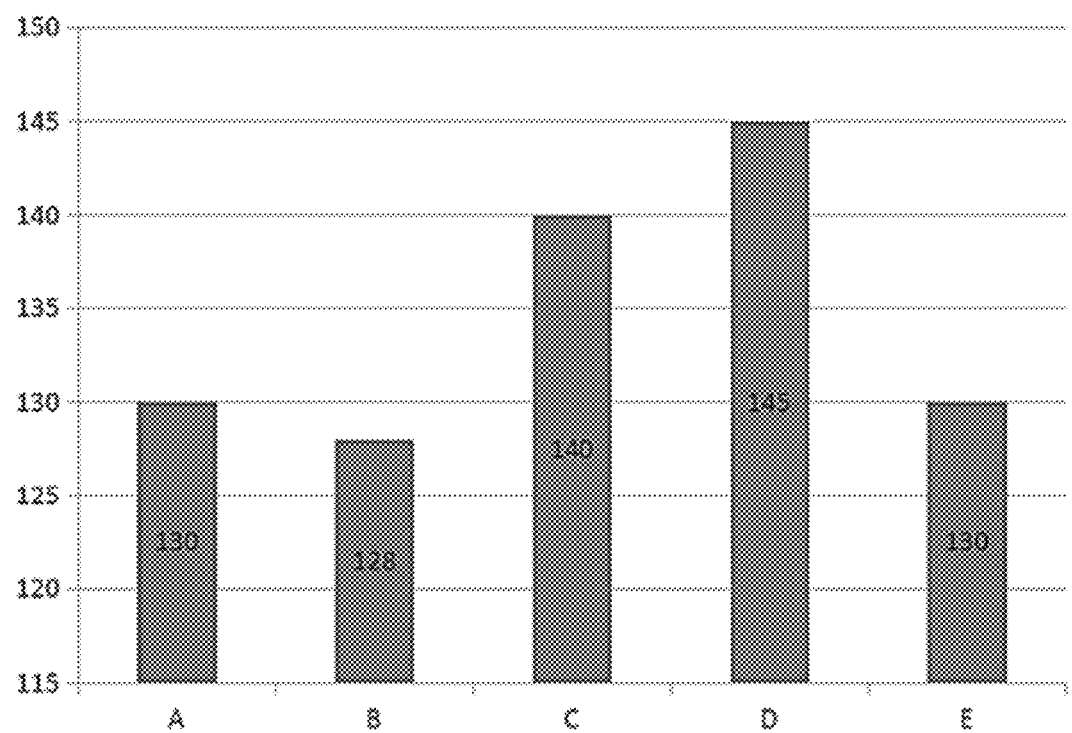
FIG. 14 is a graph depicting PM1.0 emissions of several products of the invention.

The PM1.0 emissions of the biomass solid fuel as produced in examples 1 to 5 is shown in FIG. 14. The PM1.0 emissions are determined according to the German ECN testing agency standard method.

In the above Figures, the product of Example 1 is denoted as A, Example 2 as B, Example 3 as C, Example 4 as D and Example 5 as E.

Example 6

The solid biomass fuel of Example 1 was tested in an artificial climate experiment in which it was exposed to an artificial climate chamber for 10 days. This test is an ECN standard test for assessing the moisture content of biomass fuel particles.

Figure 15:
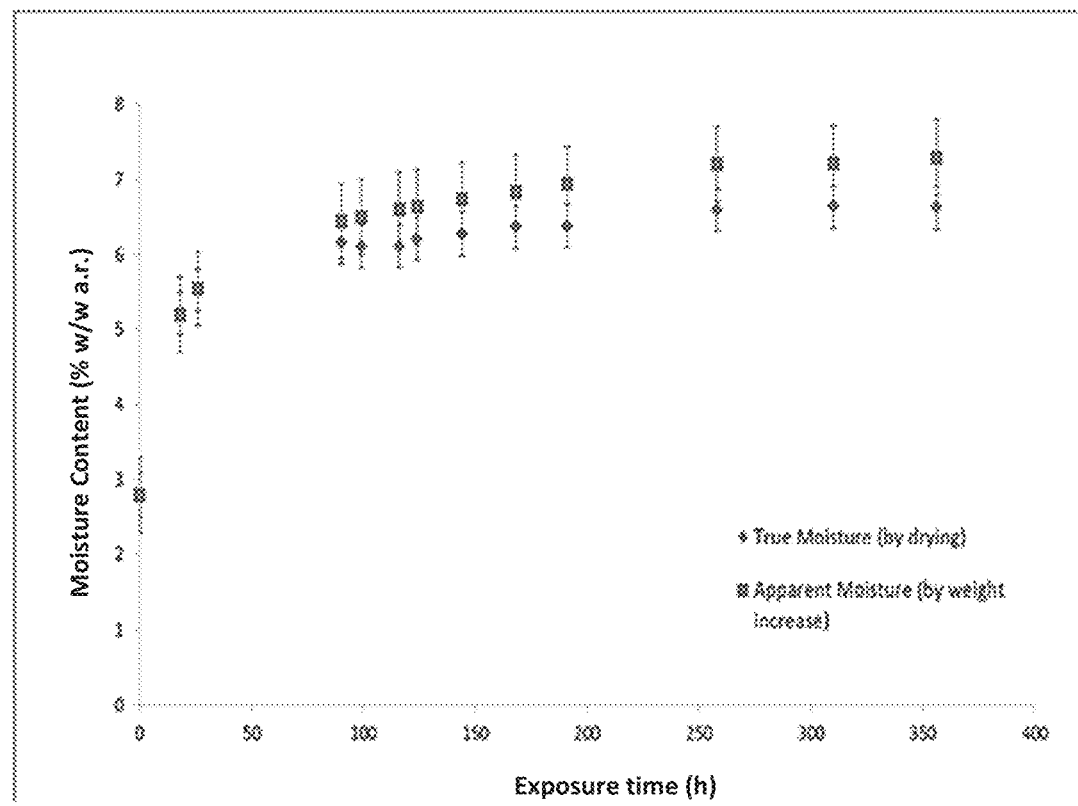
FIG. 15 shows the results of a test of a product of the invention in an artificial climate chamber.

The results of this test are shown in FIG. 15. The results in FIG. 15 show that the equilibrium moisture uptake of the biomass pellets stabilised at 6 to 7 wt % after around 14 days exposure under conditions of 27° C. and 90% relative humidity. This is a low moisture content for torrefied biomass pellets and indicates that the biomass pellets have high hydrophobicity and are highly waterproof in comparison to biomass solid fuels known in the art.

Figure 16:
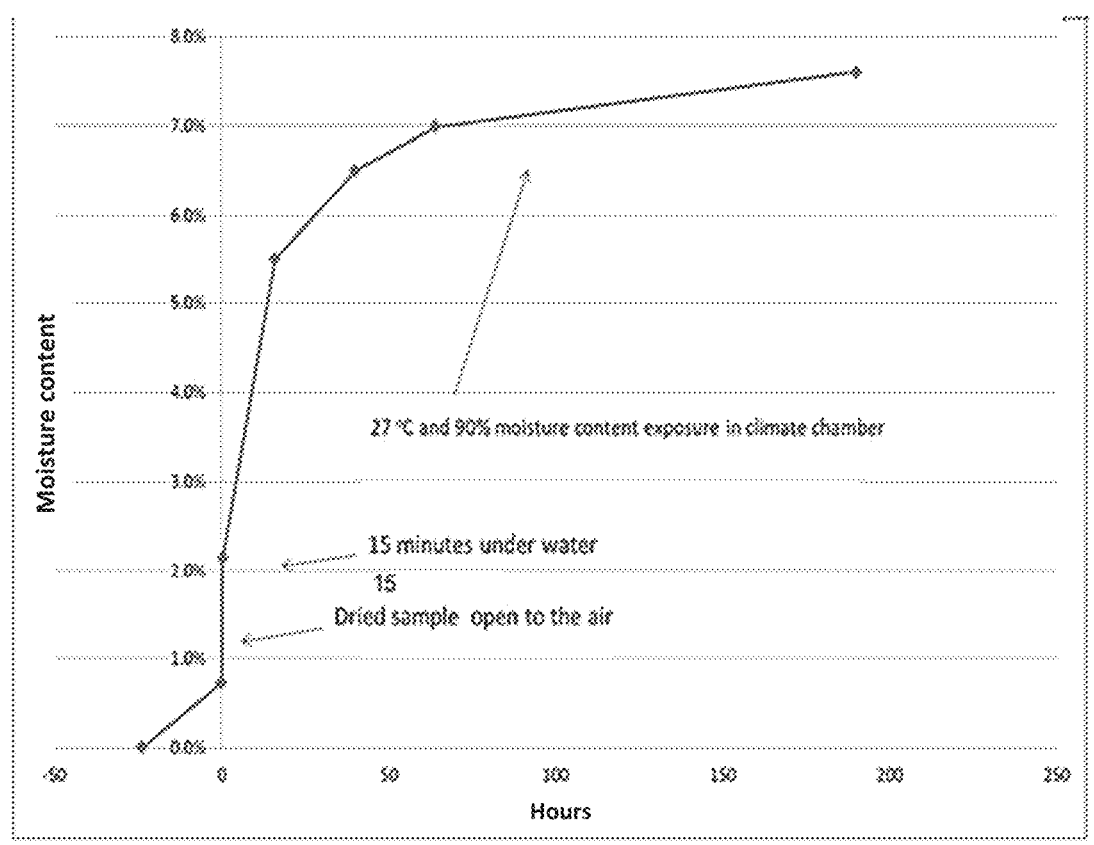
FIG. 16 shows the results of another test of a product of the invention in an artificial climate chamber.
Figure 18:
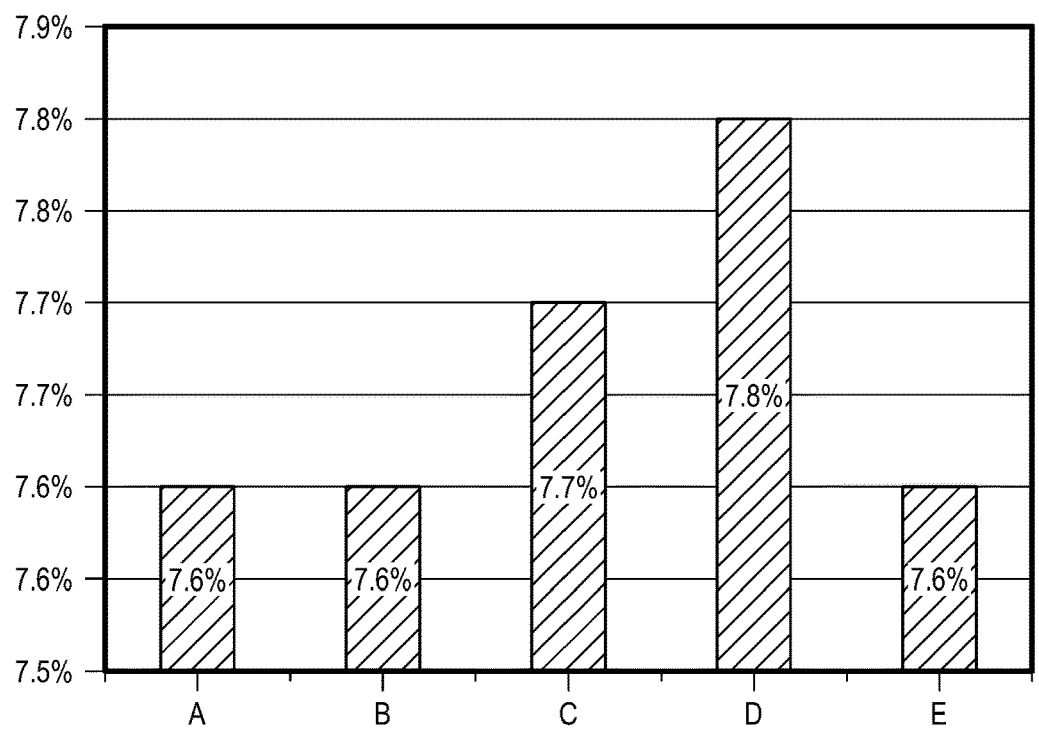
FIG. 18 shows the results of another test of a product of the invention in an artificial climate chamber.

In a second experiment in the climate chamber, the biomass solid fuel was exposed to the climate chamber after immersion in water for 15 minutes at a temperature of 27° C. After immersion in water the moisture content of the sample was 90 wt %. After 10 days of exposure in the climate chamber, the moisture content of the fuel stabilises to around 7.6%. The results of this are shown in FIGS. 16 and 18. The submersion of the pellets had no effect on the equilibrium moisture content that was reached after 10 days.

Example 7

The climate chamber experiment was repeated for the product of Examples 2 to 5.

Figure 17:
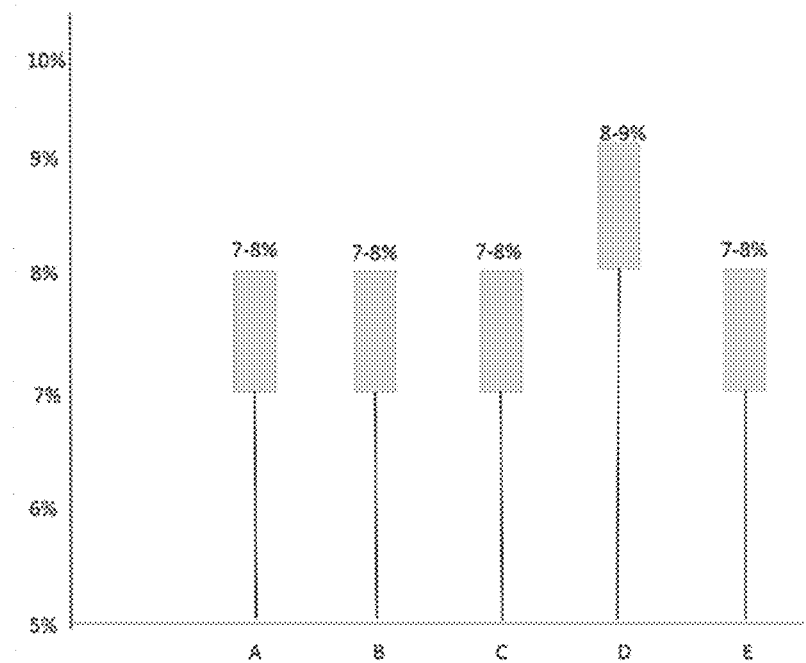
FIG. 17 shows the results of the surface moisture content of several products of the invention after testing in a climate chamber.

FIG. 17 shows the surface moisture content of the products of examples 1 to 5. It can be seen that the surface moisture and actual moisture content of the biomass pellets are very similar.

In FIGS. 15 to 18, the value on the y-axis is the weight percentage of moisture in the biomass pellets.

Example 8

FIGS. 21 and 22 show various physical and chemical properties of a solid biomass fuel pellet of the present invention.

The invention claimed is:

1. A process for producing a solid biomass fuel, wherein the process comprises the following steps:
(i) pulverising one or more sources of biomass to provide a biomass powder with an average particle diameter (D50) of from 1000 μm to 6000 μm;
(ii) molding the biomass powder with a compression mold to provide a molded biomass product having a bulk density of from 1.1 kg/L to 1.25 kg/L; wherein the molding is adapted such that the density of the molded biomass product is controlled by using a compression ratio of the compression mold of from 3.8 to 6.5;
(iii) heating the molded biomass product to a temperature of from 160° C. to 420° C. for a time period of from 0.25 to 5 hours so as to provide a solid biomass fuel;
wherein the one or more sources of biomass comprise (i) *Calliandra calothyrsus* or (ii) a mixture of straw, rice husk, and coconut shell,
wherein the bulk density of the solid biomass fuel as determined according to DIN EN 15103 is from 0.6 kg/l to 0.8 kg/l, and wherein the mechanical durability of the solid biomass fuel as determined according to DIN EN 15210-1 is 95% or more.

2. A process according to claim 1, wherein the one or more sources of biomass comprises the species *Calliandra calothyrsus*.

3. A process according to claim 1, wherein the one or more sources of biomass comprise *Calliandra calothyrsus*, straw, rice husk, and coconut shell.

4. A process according to claim 1, wherein the step of heating the molded biomass product is carried out for a time period of from 0.5 to 3 hours, and/or wherein the step of heating the molded biomass product comprises heating the molded biomass product to a temperature of from 180° C. to 350° C.

5. A process according to claim 1, wherein step (iii) of heating the molded biomass product comprises heating the molded biomass product under conditions so as to induce torrefaction of the molded biomass product.

6. A process according to claim 1, wherein the process further comprises a step of drying the biomass powder prior to molding the biomass powder to provide a molded biomass product, and/or wherein the process comprises a step of cooling the solid biomass fuel after the heating step.

7. A process according to claim 1, wherein step (iii) of heating the molded biomass product is adapted so as to control the uniformity of the solid biomass fuel, wherein adapting step (iii) so as to control the uniformity of the solid biomass product comprises conducting step (iii) in an apparatus in which the molded biomass product is rotated whilst being heated, wherein adapting step (iii) so as to control the uniformity of the solid biomass product comprises controlling the speed or direction of rotation of the solid biomass product, wherein the molded biomass product is rotated in the apparatus in both an anticlockwise and clockwise direction.

8. A process according to claim 1, wherein the mechanical durability of the solid biomass fuel as determined according to DIN EN 15210-1 is 96% or more, 97% or more, or 98% or more.

9. A process according to claim 1, wherein:
(i) the one or more sources of biomass comprises *Calliandra calothyrsus*, and wherein the bulk density of the solid biomass fuel is from 0.64 kg/l to 0.66 kg/l, and wherein the mechanical durability is 96% or more; or
(ii) the one or more sources of biomass comprises a mixture of *Calliandra calothyrsus*, straw, rice husk, and coconut shell, and wherein the bulk density of the solid biomass fuel is from 0.61 kg/l to 0.63 kg/l, and wherein the mechanical durability is 95% or more; or
(iii) the one or more sources of biomass comprises a mixture of a mixture of straw, rice husk and coconut shell, and wherein the bulk density of the solid biomass fuel is from 0.60 kg/l to 0.62 kg/l, and wherein the mechanical durability is 95% or more;
wherein the bulk density is determined according to DIN EN 15103, and wherein the mechanical durability is determined according to DIN EN 15210-1.

10. A process according to claim 1, wherein
(i) the total dry sulphur content of the biomass solid fuel is 0.05 wt % or less, wherein the total dry sulphur content is determined according to DIN EN 15289;
(ii) the total dry hydrogen content of the biomass solid fuel is 5 wt % or more, wherein the total dry hydrogen content is determined according to DIN EN 15104;
(iii) the total dry oxygen content of the biomass solid fuel is 34 wt % or more, wherein the total dry oxygen content is determined according to DIN EN 15296;
(iv) the total dry carbon content of the biomass solid fuel is 50 wt % or more, wherein total dry carbon content is determined according to DIN EN 15104; and/or
(v) the total dry nitrogen content of the biomass solid fuel is less than 0.3 wt %, wherein the total dry nitrogen content is determined according to DIN EN 15104.

11. A process according to claim 1, wherein the solid biomass fuel is waterproof for up to 20 days.

12. A process according to claim 1, wherein
(i) the chemical oxygen demand (COD) of the solid biomass fuel when immersed in water is 5000 ppm or less, wherein the chemical oxygen demand is determined according to GB/11914-89;
(ii) the fixed carbon content of the solid biomass fuel is 25 wt % or more;
(iii) the ash content of the solid biomass fuel is less than 5 wt %; and/or (iv) the volatile matter content of the solid biomass fuel is from 60 wt % to 80 wt %.

13. A process according to claim 1, wherein the moisture content of the solid biomass fuel is less than 5 wt %, and/or wherein the calorific value of the solid biomass fuel is from 5000 kcal/kg dry mass to 7000 kcal/kg dry mass.

14. A process according to claim 1, wherein the bulk density of the molded biomass product is A, and the bulk density of the solid biomass fuel is B, and wherein B/A is from 0.55 to 1, wherein the bulk density is determined according to DIN EN 15103.

15. A process according to claim 1 comprising the step of combusting the solid biomass fuel so as to produce energy.

16. A process according to claim 15, wherein the solid biomass fuel is co-fired and combusted alongside a fossil fuel.

17. A process for producing a solid biomass fuel, wherein the process comprises the following steps:
(i) pulverising one or more sources of biomass to provide a biomass powder with an average particle diameter (D50) of from 1000 μm to 6000 μm;
(ii) molding the biomass powder with a compression mold to provide a molded biomass product having a bulk density of from 1.1 kg/l to 1.25 kg/l; wherein the molding is adapted such that the density of the molded biomass product is controlled by using a compression ratio of the compression mold of from 3.8 to 6.5; and
(iii) heating the molded biomass product to a temperature of from 160° C. to 420° C. for a time period of from 0.25 to 5 hours so as to provide a solid biomass fuel; wherein step (iii) of heating the molded biomass product is adapted so as to control the uniformity of the solid biomass fuel, wherein adapting step (iii) so as to control the uniformity of the solid biomass fuel comprises conducting step (iii) in an apparatus in which the molded biomass product is rotated whilst being heated, wherein adapting step (iii) so as to control the uniformity of the solid biomass product comprises controlling the speed or direction of rotation of the solid biomass product,
wherein the one or more sources of biomass comprise (i) *Calliandra calothyrsus* or (ii) a mixture of straw, rice husk, and coconut shell; and wherein the bulk density of the solid biomass fuel as determined according to DIN EN 15103 is from 0.6 kg/l to 0.8 kg/l and wherein the mechanical durability of the solid biomass fuel as determined according to DIN EN 15210-1 is 95% or more.

* * * * *